US012647515B2

(12) United States Patent
Dasher et al.

(10) Patent No.: US 12,647,515 B2
(45) Date of Patent: Jun. 2, 2026

(54) REAL-TIME MESSAGING ASSOCIATED WITH CALL SETUP USING CALLER DEVICE CONTEXTUAL INFORMATION

(71) Applicant: Adeia Guides Inc., San Jose, CA (US)

(72) Inventors: Charles Dasher, Lawrenceville, GA (US); Reda Harb, Saint Petersburg, FL (US); Jean-Yves Couleaud, Mission Viejo, CA (US)

(73) Assignee: Adeia Guides Inc., San Jose, CA (US)

( * ) Notice: Subject to any disclaimer, the term of this patent is extended or adjusted under 35 U.S.C. 154(b) by 108 days.

(21) Appl. No.: 18/930,733

(22) Filed: Oct. 29, 2024

(65) Prior Publication Data

US 2026/0122180 A1 Apr. 30, 2026

(51) Int. Cl.
*H04M 3/436* (2006.01)
*H04L 65/1069* (2022.01)
*H04L 65/65* (2022.01)

(52) U.S. Cl.
CPC ...... *H04M 3/4365* (2013.01); *H04L 65/1069* (2013.01); *H04L 65/65* (2022.05)

(58) Field of Classification Search
CPC .................................................. H04M 3/4365
See application file for complete search history.

(56) References Cited

U.S. PATENT DOCUMENTS 8,867,724 B2 10/2014 Gorti et al.
10,554,814 B1 * 2/2020 Srivastava ............ H04M 1/575

2009/0022283 A1 1/2009 Pollitt
2019/0069142 A1 * 2/2019 Chiang ................. H04W 76/10
2023/0239400 A1 * 7/2023 Trim ................. H04M 3/42059
704/231

(Continued)

FOREIGN PATENT DOCUMENTS

GB 2432744 A 5/2007
WO 2018/116310 A1 6/2018

OTHER PUBLICATIONS

3GPP TS 23.203, "3rd Generation Partnership Project; Technical Specification Group Services and System Aspects; Policy and charging control architecture (Release 19)," V. 19.0.0, Section 6.1, Sep. 2024, 43 pages.

(Continued)

*Primary Examiner* — Boris D Grijalva Lobos
(74) *Attorney, Agent, or Firm* — HG LAW LLP

(57) ABSTRACT

Real-time messaging associated with call setup is provided. Also, the functionality of communications, for example, for cellular calling applications, is enhanced. An illustrative method includes receiving a call from a caller device, initiating call setup at a recipient device, gathering context at the caller device, generating a message (for example, text, audio, picture, video, or the like) based at least in part on the context using a machine learning model, playing a notification at the recipient device, and playing the message at a second device associated with the recipient device. Another illustrative method includes initiating call setup at the recipient device, gathering context at the recipient device, generating a message (for example, text, audio, picture, video, or the like) based at least in part on the context using a machine learning model, and playing the message at the caller device.

20 Claims, 28 Drawing Sheets

(56) References Cited

U.S. PATENT DOCUMENTS

| | | | | |
|---|---|---|---|---|
| 2023/0254407 A1* | 8/2023 | Shah | .................. | H04M 3/5335 |
| | | | | 455/415 |
| 2025/0220099 A1* | 7/2025 | Allu Balan | ............. | G10L 15/26 |

OTHER PUBLICATIONS

3GPP TS 23.228,"3rd Generation Partnership Project; Technical Specification Group Services and System Aspects; IP Multimedia Subsystem (IMS); Stage 2 (Release 19)," V19.0.0, Section 5.6, Sep. 2024, 28 pages.

3GPP TS 24.229, "3rd Generation Partnership Project; Technical Specification Group Core Network and Terminals; IP multimedia call control protocol based on Session Initiation Protocol (SIP) and Session Description Protocol (SDP); Stage 3 (Release 19)," V19.0.0, Section 5.1.1.1, Sep. 2024, 40 pages.

3GPP TS 24.229, "3rd Generation Partnership Project; Technical Specification Group Core Network and Terminals; IP multimedia call control protocol based on Session Initiation Protocol (SIP) and Session Description Protocol (SDP); Stage 3 (Release 19)," V19.0.0, Section 5.2.1, Sep. 2024, 43 pages.

3GPP TS 26.114, "3rd Generation Partnership Project; Technical Specification Group Services and System Aspects; IP Multimedia Subsystem (IMS); Multimedia Telephony; Media handling and interaction (Release 18)," V18.8.0, Section 6.1, Sep. 2024, 19 pages.

3GPP TS 26.114, "3rd Generation Partnership Project; Technical Specification Group Services and System Aspects; IP Multimedia Subsystem (IMS); Multimedia Telephony; Media handling and interaction (Release 18)," V18.8.0, Section 6.3, Sep. 2024, 19 pages.

Baugher, M., et al., "Goals and Features," The Secure Real-time Transport Protocol (SRTP), Section 2, Request for Comments: 3711, Mar. 2004, 4 pages.

Rosenberg, J., et al., "Querying for Capabilities," SIP: Session Initiation Protocol, Section 11, Request for Comments: 3261, Jun. 2002, 10 pages.

Rosenberg, J., et al., "Structure of the Protocol," SIP: Session Initiation Protocol, Section 5, Request for Comments: 3261, Jun. 2002, 11 pages.

Schulzrinne, H., et al., "RTP Use Scenarios," RTP: A Transport Protocol for Real-Time Applications, Section 2, Request for Comments: 3550, Jul. 2003, pp. 4.

U.S. Appl. No. 18/930,746, filed Oct. 29, 2024, Charles Dasher.

* cited by examiner

300

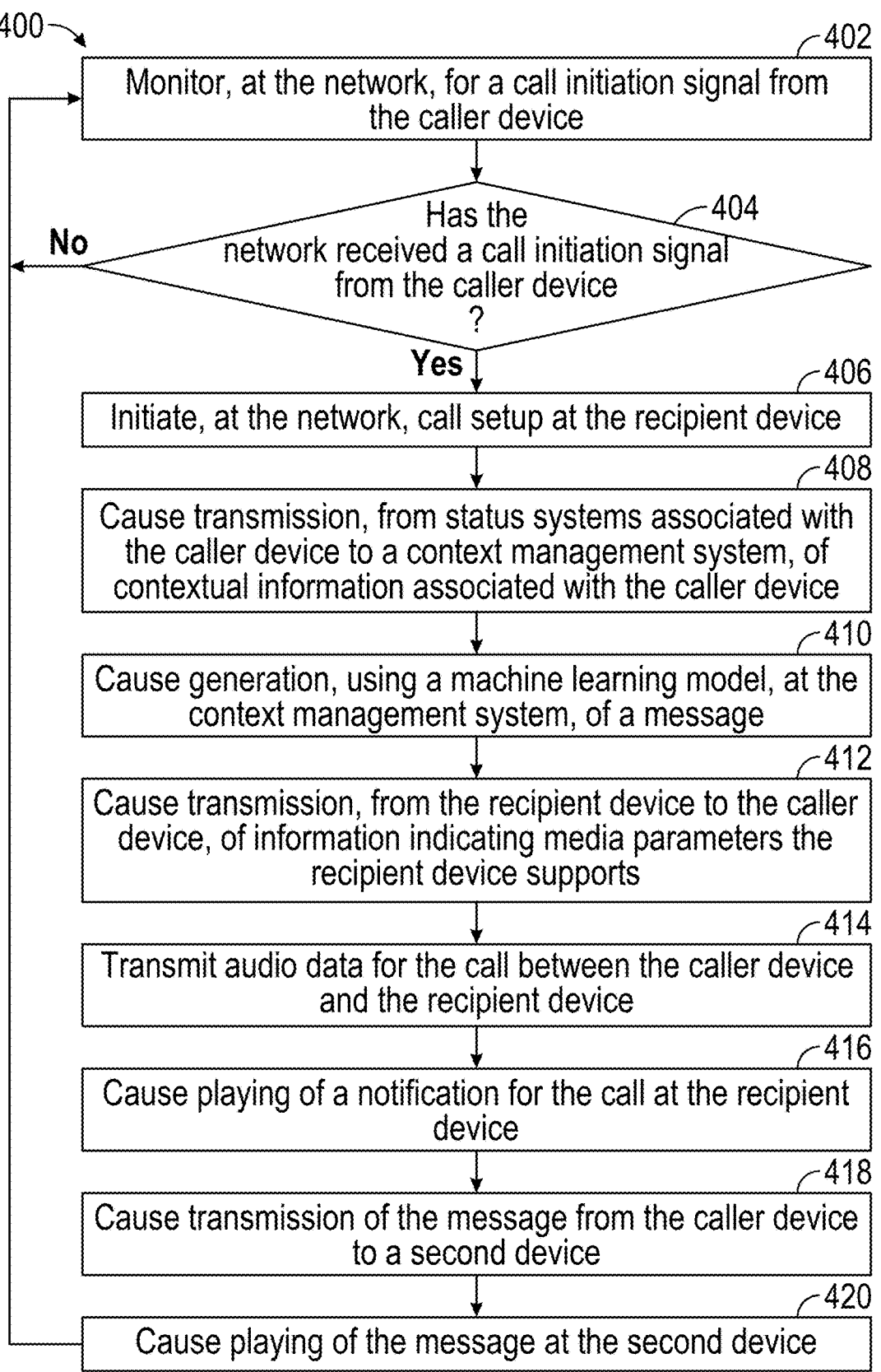

400

402
Monitor, at the network, for a call initiation signal from the caller device 404
Has the network received a call initiation signal from the caller device ?

No

Yes

406
Initiate, at the network, call setup at the recipient device

408
Cause transmission, from status systems associated with the caller device to a context management system, of contextual information associated with the caller device 410
Cause generation, using a machine learning model, at the context management system, of a message 412
Cause transmission, from the recipient device to the caller device, of information indicating media parameters the recipient device supports 414
Transmit audio data for the call between the caller device and the recipient device 416
Cause playing of a notification for the call at the recipient device 418
Cause transmission of the message from the caller device to a second device 420
Cause playing of the message at the second device

FIG. 4

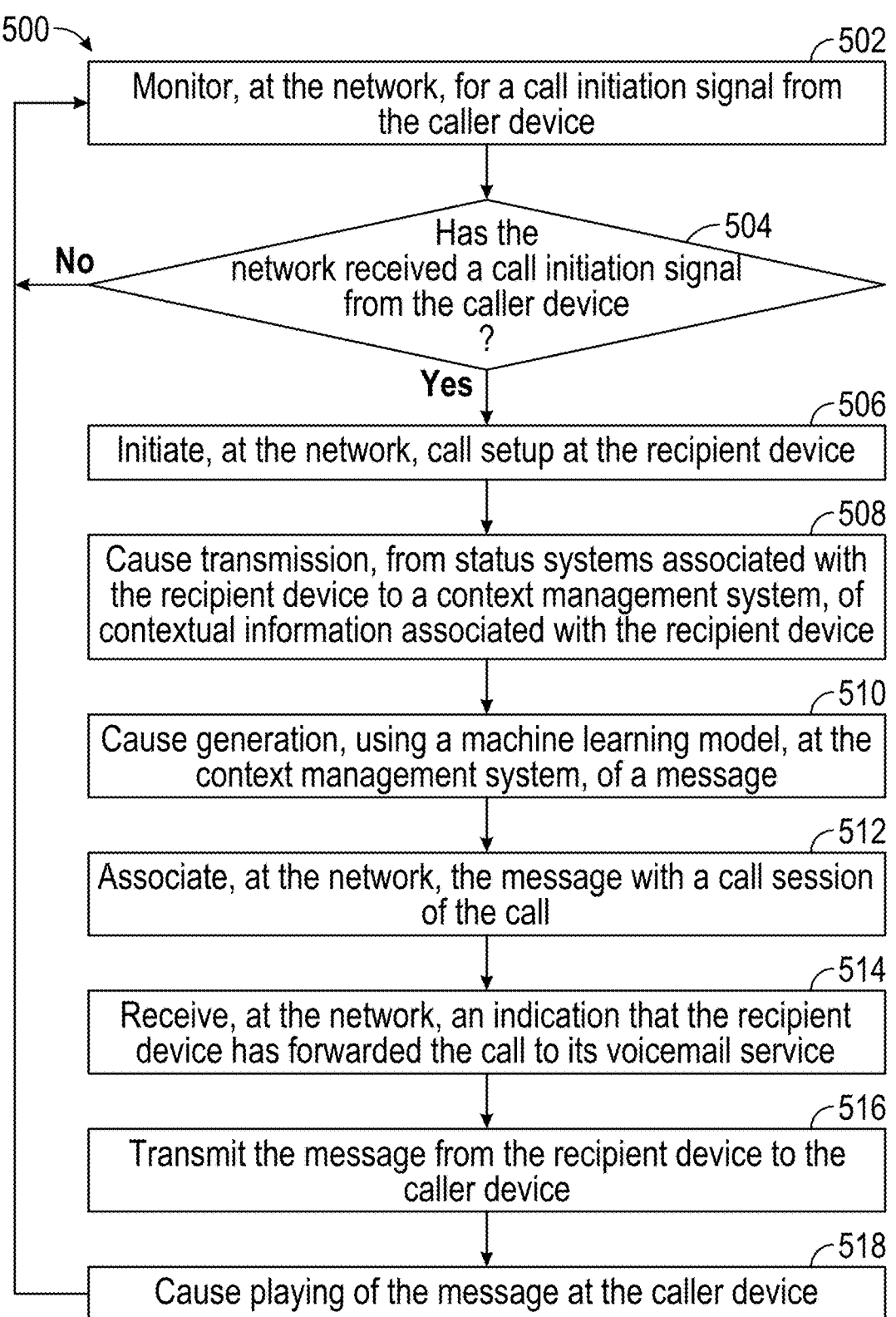

500

502
Monitor, at the network, for a call initiation signal from the caller device 504
Has the network received a call initiation signal from the caller device ?

No

Yes

506
Initiate, at the network, call setup at the recipient device

508
Cause transmission, from status systems associated with the recipient device to a context management system, of contextual information associated with the recipient device 510
Cause generation, using a machine learning model, at the context management system, of a message 512
Associate, at the network, the message with a call session of the call 514
Receive, at the network, an indication that the recipient device has forwarded the call to its voicemail service 516
Transmit the message from the recipient device to the caller device 518
Cause playing of the message at the caller device

Figure 6:
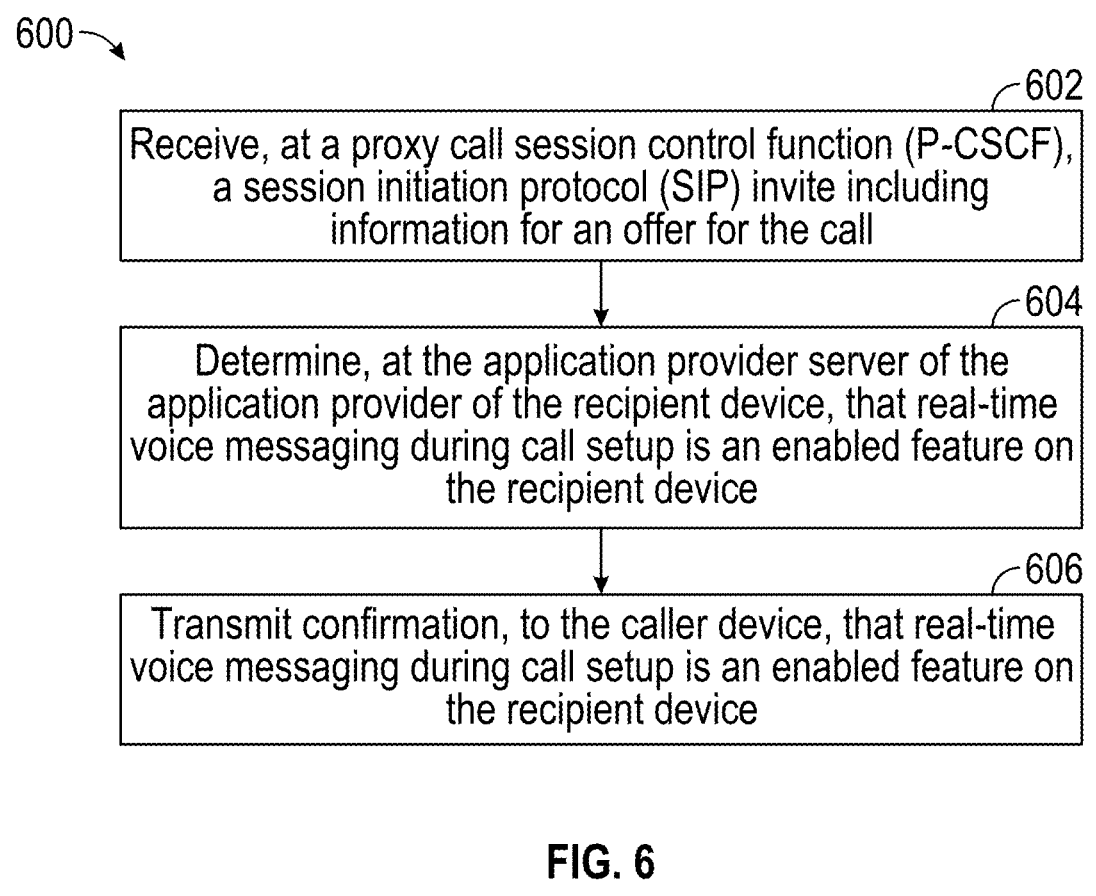

Receive, at a proxy call session control function (P-CSCF), a session initiation protocol (SIP) invite including information for an offer for the call

604

Determine, at the application provider server of the application provider of the recipient device, that real-time voice messaging during call setup is an enabled feature on the recipient device

606

Transmit confirmation, to the caller device, that real-time voice messaging during call setup is an enabled feature on the recipient device

801
816
814
810 User Input Interface
812 Display
808
806
804
802
818 Microphone
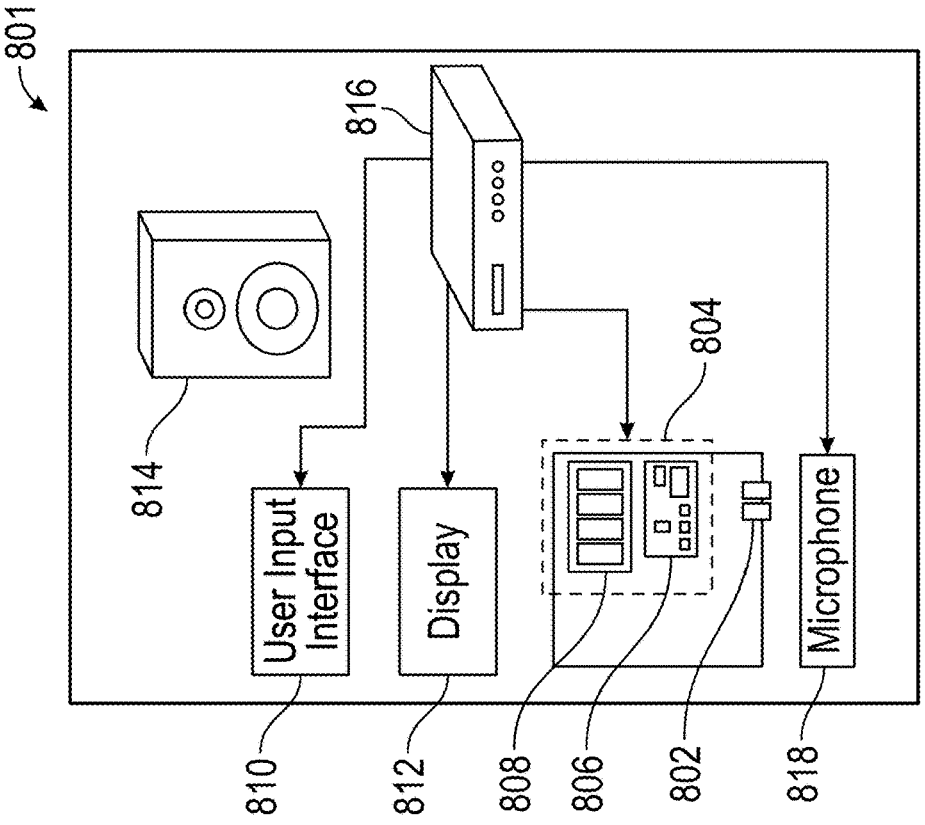
FIG. 8
814
810 812
806
808
804
802 818
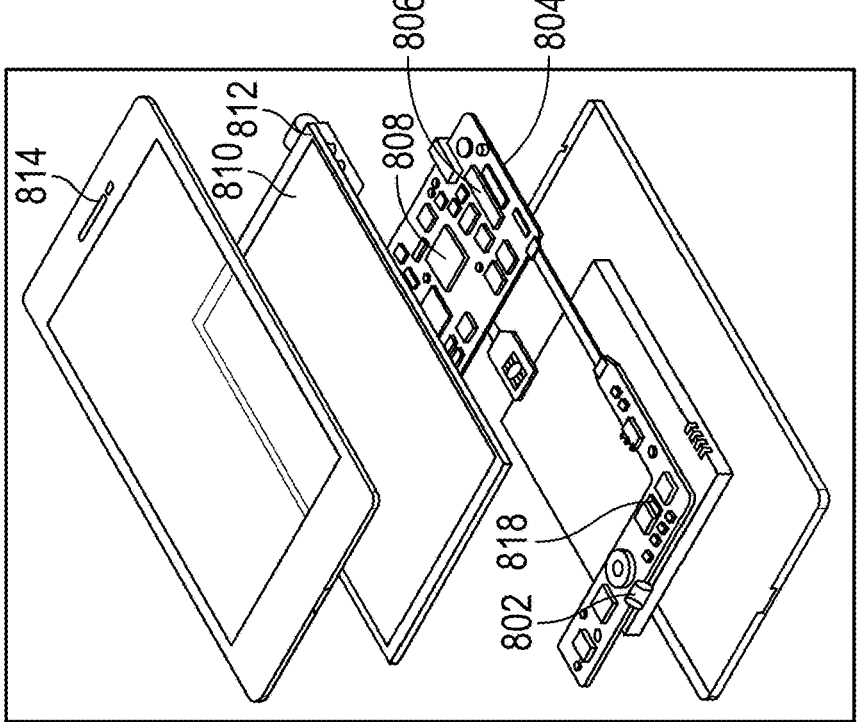
800

REAL-TIME MESSAGING ASSOCIATED WITH CALL SETUP USING CALLER DEVICE CONTEXTUAL INFORMATION

BACKGROUND

The present disclosure relates to real-time messaging associated with, and more particularly to systems and related processes for enhancing the functionality of communications, e.g., for cellular calling applications.

SUMMARY

In modern communication, there are scenarios where users need immediate context to determine the urgency of an incoming call. For example, when a person has dirty hands while cooking and their spouse calls, they may need to know whether the call is urgent or if it can be deferred to voicemail. Current technologies do not adequately address this need for real-time urgency communication during the call setup process.

For example, call setup refers to, in 3GPP standards, the sequence of signaling procedures and message exchanges between network elements and user equipment (UE) to establish a voice or data call. This process includes initiating, negotiating, and confirming the call parameters to ensure a successful connection. Further, in another example, call setup encompasses the entire process of establishing any type of communication session, including text (e.g., SMS), voice (e.g., voice messages, voicemail, or the like), video, and data calls (e.g., Zoom), across various telecommunications networks. This involves not only the signaling procedures but also the allocation of network resources, authentication, and quality of service (QoS) management to ensure a reliable and efficient connection. Also, in another example, in the context of mobile networks, call setup specifically refers to the initial signaling exchanges between a mobile device and the cellular network to establish a voice call. This includes the steps of dialing, network authentication, and the allocation of a voice channel for the duration of the call.

In some approaches, recipient devices show live video previews of a video feed from caller devices before the call is connected. In such approaches, a visual cue gives more context for the user of the recipient device to decide whether to connect the call. However, these approaches are deficient because they require visual attention and do not facilitate immediate voice-based urgency communication during the ringing phase.

In another approach, recipient devices provide real-time transcription of voicemail messages while they are being left by caller devices. In this approach, the transcription is displayed on the screen of the recipient device for the user of the recipient device to decide whether to pick up the call. However, this approach is deficient because it is beneficial for screening calls, but only after a caller has been sent to voicemail. Additionally, it relies on text transcription and visual interaction, which may not be feasible in many situations.

To overcome these and other problems, systems and methods are provided herein for techniques for enhancing the functionality of communications, e.g., for cellular calling applications. For example, voice-based context and urgency communication (e.g., which does not require visual attention) are provided. Also, for example, analysis of contextual information, such as the caller's location and historical interaction patterns, are provided. Further, for example, the analysis of contextual information triggers and/or provides context and/or urgency to messages. The systems and methods provide a combination of real-time messaging, low latency communication, and context-aware call management, enhancing functionality of communications, e.g., for cellular calling applications.

In some embodiments, the system receives, at a network, a signal indicating the initiation of a call from the caller device, and initiates, at the network, call setup at the recipient device. In some implementations, the system causes transmission, from status systems associated with the caller device to a context management system, of contextual information associated with the caller device, and then causes generation, e.g., using a machine learning model, at the context management system, of a message. In some embodiments, status systems associated with the caller device are smart watches, smart home systems, smart speakers, smart vehicle systems, televisions, and tablets; combinations of the same; or the like, that provide real-time activity data detected at the status system to the caller device. In some examples, the message is based on the contextual information associated with the caller device. In some embodiments, the system then causes transmission, from the recipient device to the caller device, of information indicating the media parameters the recipient device supports. The system then, for example, transmits audio data for the call between the caller device and the recipient device. In some implementations, the system then causes playing of a message and/or notification for the call at the recipient device, transmitting the message and/or notification to a second device associated with the recipient device, and causes playing of the message at the second device.

Such aspects ensure that a recipient notices a message regardless of which device they are using, enhancing the flexibility and reach of communication. Further, by integrating carrier service and real-time communication protocols, this system uses contextual information gathered from the devices of callers.

In some embodiments, the contextual information associated with the caller device is at least one of a voice recording from the caller device, an urgency level associated with the voice recording from the caller device, stored historical interaction patterns between a caller user profile associated with the caller device and a recipient user profile associated with the recipient device and the second device, or activity data from other devices associated with the caller user profile, combinations of the same, or the like.

In some implementations, playing the message and/or the notification is based on contextual information associated with at least one of the recipient device, the second device, and/or a recipient user profile (e.g., associated with the recipient device and the second device), combinations of the same, or the like.

In some embodiments, the contextual information associated with the recipient device, the second device, and the recipient user profile is at least one of location of the recipient device; location of the second device; device-specific settings of the second device and the recipient device; time-based notification settings associated with at least one of the recipient user profile, the recipient device, or the second device; privacy settings associated with at least one of the recipient user profile, the recipient device, or the second device; preset communication settings for communications between the recipient user profile and a caller user profile associated with the caller device; combinations of the same; or the like.

In some examples, the device-specific settings are for altering the notification and the message based on the second device being headphones or a smart speaker. In some embodiments, the preset communication settings include an indication that calls from devices associated with the caller user profile can cause the generated message (e.g., one or more preview messages) to be played on the second device.

In some embodiments, the privacy settings include an indication that the recipient device is in a "do not disturb" (DND) mode and the privacy settings include altering at least one of the notification or the message based on the indication that the recipient device is in the DND mode, for example, by playing a softer ringtone, a vibration, or just a visual banner on the recipient device. In some examples, the privacy settings include an indication that the recipient device is in a public location and wherein the privacy settings comprise altering at least one of the notification or the message based on the indication that the recipient device is in a public location, for example, by playing a softer ringtone, a vibration, or just a visual banner on the recipient device.

Such aspects utilize detailed contextual information to enhance the decision-making process for recipients with accurate and up-to-date information about the caller's current activity, including the caller's location, purpose of the call, urgency level, and device activity data. Further, this system utilizes the context of the recipient as well to determine the manner of delivering the message from the caller.

In some embodiments, the system receives, at the network, a signal indicating the initiation of a call from the caller device, and initiates, at the network, call setup at the recipient device. In some examples, the system then causes transmission, from status systems associated with the recipient device to a context management system, of contextual information associated with the recipient device. In some embodiments, status systems associated with the recipient device are smart watches, smart home systems, smart speakers, smart vehicle systems, televisions, and tablets; combinations of the same; or the like, that provide real-time activity data detected at the status system to the recipient device. In some implementations, the system causes generation, e.g., using a machine learning model, at a context management system, of a message. In some embodiments, the message is based on the contextual information associated with the recipient device. In some embodiments, the contextual information associated with the recipient device is at least one of location of the recipient device, stored historical interaction patterns between the caller user profile associated with the caller device and a recipient user profile associated with the recipient device, privacy settings associated with at least one of the recipient user profile or the recipient device; preset communication settings for communications between the recipient user profile and the caller user profile; or activity data from other devices associated with the recipient user profile; combinations of the same; or the like.

In some examples, the system associates, at the network, the message with a call session of the call, and then receives, at the network, an indication that the recipient device has forwarded the call to its voicemail. In some embodiments, the system then transmits the message from the recipient device to the caller device, e.g., directly or via a server, and causes playing of the message at the caller device.

Such aspects ensure that a caller user receives a message and/or notification from the recipient about why their call is not being answered, even though the recipient does not end up answering the call. Further, by integrating carrier service and contextual information gathering, this system uses contextual information gathered from the device of the recipient to add further information as to why the recipient is not picking up the call.

In some embodiments, the system uses a Session Initiation Protocol (SIP) invite to initiate call setup at the recipient device, and the information indicating the media parameters the recipient device supports is within a SIP 200 OK message with a Session Description Protocol (SDP) answer. In some embodiments, the system uses real-time transport Protocol (RTP) to transmit audio data for the call between the caller device and the recipient device and the system uses RTP to stream between the caller device and the second device to transmit the message to the second device. In some embodiments, the system initiates call setup at the recipient device using a SIP invite by receiving, at a proxy call session control function (P-CSCF), a SIP invite including information for an offer for a primary call; determining, at the application provider server of the application provider associated with the recipient device, that real-time messaging associated with call setup is an enabled feature on the recipient device; and transmitting confirmation, to the caller device, that real-time messaging associated with call setup is an enabled feature on the recipient device. In some embodiments, the system transmits the message to the second device using an RTP stream by receiving, at the P-CSCF, a SIP invite including information for an offer for the message and transmitting the offer for the message to the recipient device.

Such aspects utilize Voice over New Radio (VoNR) and SIP to enable real-time messaging during the call setup phase. In some examples, this system leverages the 5G core network for lower latency and higher capacity, ensuring efficient call setup and maintenance. In some embodiments, these voice services running over the 5G network provide high-quality voice calls directly over the 5G infrastructure. In some embodiments, SIP facilitates communications to initiate, maintain, and terminate real-time sessions that include voice, video, and messaging applications. Further, in some examples, SIP for session control and RTP for media transport enable efficient integration of voice, video, and messaging services. For example, SIP is flexible enough to support the creation of secondary sessions for proposed messaging during the call setup, and RTP works in conjunction with SIP to ensure that voice data, including messages, is transmitted in real time with minimal latency.

The present invention is not limited to the combination of the elements as listed herein and may be assembled in any combination of the elements as described herein. These and other capabilities of the disclosed subject matter will be more fully understood after a review of the following figures, detailed description, and claims.

BRIEF DESCRIPTION OF THE DRAWINGS

The present disclosure, in accordance with one or more various embodiments, is described with reference to the following figures. The drawings are provided for purposes of illustration only and merely depict typical or example embodiments. These drawings are provided to facilitate an understanding of the concepts disclosed herein and do not limit the breadth, scope, or applicability of these concepts. It should be noted that for clarity and ease of illustration these drawings are not necessarily made to scale.

The embodiments herein may be better understood by referring to the following description in conjunction with the accompanying drawings, in which like reference numerals may indicate identical or functionally similar elements, of which:

FIG. 4 is a flowchart of an illustrative process for real-time messaging, from a caller device to recipient devices, associated with call setup, in accordance with some embodiments of the present disclosure;

FIG. 5 is a flowchart of an illustrative process for real-time messaging, from a recipient device to a caller device, associated with call setup, in accordance with some embodiments of the present disclosure;

FIG. 6 is a flowchart of an illustrative process for initiating call setup at a recipient device using a SIP invite, in accordance with some embodiments of the present disclosure;

FIG. 8 is a block diagram of an illustrative media device, in accordance with some embodiments of this disclosure;

The drawings are intended to depict only typical aspects of the subject matter disclosed herein, and therefore should not be considered as limiting the scope of the disclosure. Those skilled in the art will understand that the structures, systems, devices, and methods specifically described herein and illustrated in the accompanying drawings are non-limiting exemplary embodiments and that the scope of the present invention is defined solely by the claims.

DETAILED DESCRIPTION

Real-time voice messaging is provided. The voice messaging is provided associated with call setup, involving caller and recipient devices connected through a network. Contextual information (e.g., voice recordings, urgency levels, device locations, historical interaction patterns, or the like) enhances the voice messaging. Machine learning models are employed to generate personalized messages based on this contextual data, which are then transmitted and played on the recipient or caller devices. Notifications and messages are provided according to device-specific settings, privacy preferences, and environmental factors. Context-aware and personalized communications are provided. Additionally, the system can modify notifications based on the recipient's environment, such as noise levels or public settings, and can translate messages into the preferred language of the user.

Figure 1A:
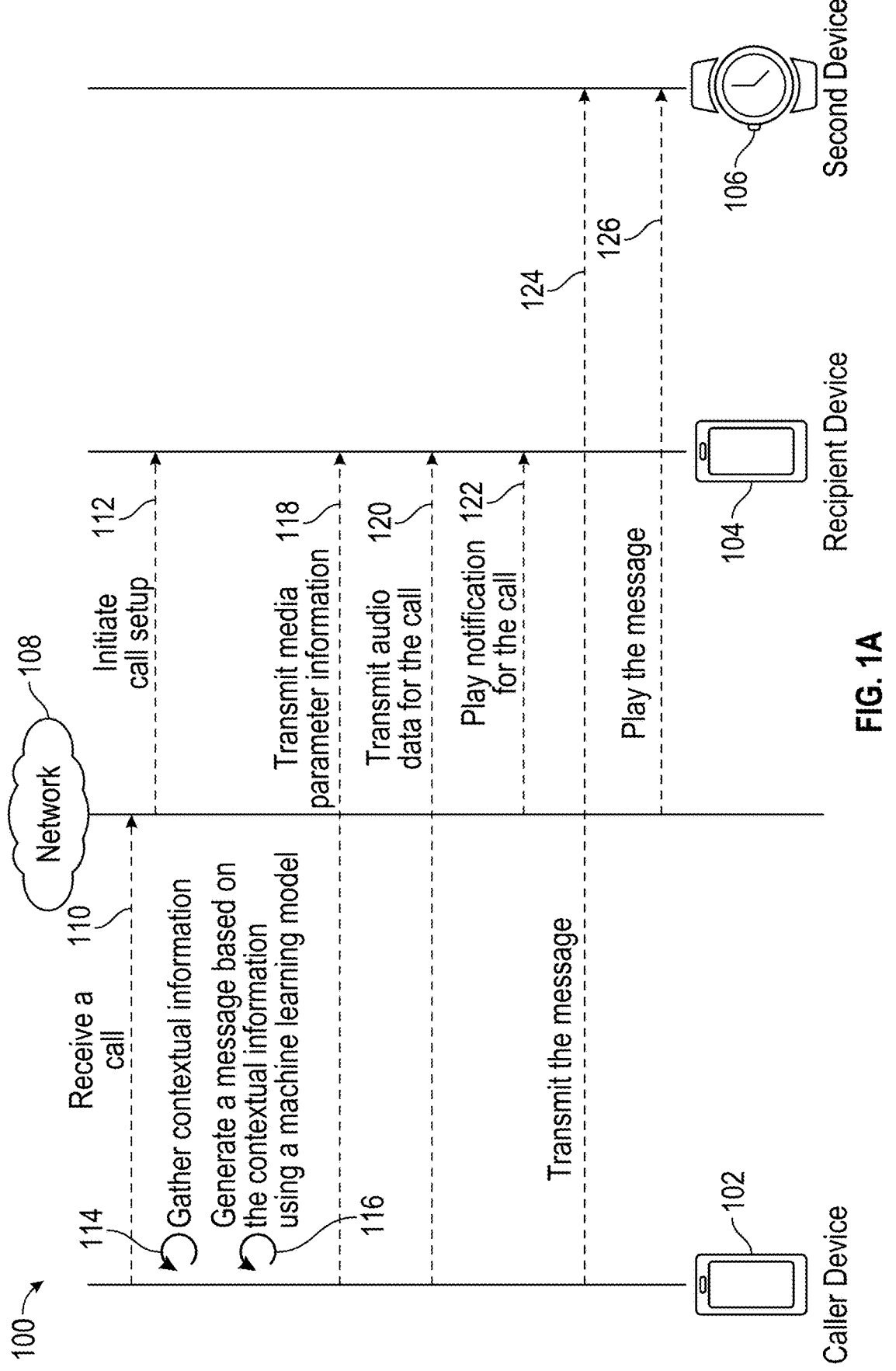
FIG. 1A is a sequence diagram of an illustrative process for real-time messaging, from a caller device to recipient devices, associated with call setup, in accordance with some embodiments of the present disclosure.

FIG. 1A is a sequence diagram of an illustrative process for real-time voice messaging, from a caller device to recipient devices, associated with call setup, in accordance with some embodiments of the present disclosure. In some embodiments, system 100 includes caller device 102, recipient device 104, second device 106, and network 108. System 100 may include additional servers, devices, and/or networks.

In some embodiments, network 108 is a cellular network. In some embodiments, network 108 is a 5G network. In some embodiments, network 108 is an internet protocol-based network. In some embodiments, network 108 is a Wi-Fi network.

In some embodiments, at 110, network 108 receives a call from caller device 102. At 112, network 108 initiates call setup at recipient device 104. At 114, caller device 102 gathers contextual information. In some embodiments, the contextual information includes a voice recording, for example, a voice message recorded at caller device 102. In some examples, the contextual information includes an urgency level assigned to the voice recording. In some embodiments, the contextual information also includes at least one of the location of the caller device; stored historical interaction patterns between a caller user profile associated with the caller device and a recipient user profile associated with the recipient device and the second device; activity data from other devices associated with the caller user profile, such as smart watches, smart home systems, smart speakers, smart vehicle systems, televisions, and tablets; combinations of the same; or the like. In one example, the contextual information includes real-time activity detection data from a smart watch, such as an Apple Watch. Many smart watches are able to track whether a user is currently engaged in a workout, such as running, biking, an exercise class (e.g., yoga) or swimming and send that data to a connected device, e.g., a phone. In another example, the contextual information includes real-time data from devices that are part of a smart home system, e.g., a smart cooking appliance. Many smart cooking appliances are able to track whether a user is currently cooking and send that data to a connected device, e.g., a phone. In another example, the contextual information includes real-time data from a smart vehicle system. Many smart vehicle systems are able to track whether a user is currently driving, as well as where they are in relation to their destination and send that data to a connected device, e.g., a phone.

At 116, caller device 102 generates a message based on the contextual information using a machine learning model, e.g., the machine learning model as described further below with reference to FIG. 7. In one example, when the contextual information includes data from a smart home appliance indicating that the caller is currently cooking, the generated message will include that the caller is currently cooking. In some cases, the generated message will also include a prediction based on the contextual information, e.g., that the caller likely wants to know what the recipient wants for dinner, or whether the recipient will be home in time for dinner. In another example, when the contextual information includes data from a smart vehicle system indicating that the caller is currently driving and is ten minutes from the location of the recipient, the generated message will include this information. At 118, caller device 102 transmits media parameter information to recipient device 104, as described further below with reference to FIGS. 2 and 3. At 120, caller device 102 transmits audio data for the call to recipient device 104. In some embodiments, this transmission is done using an RTP stream.

At 122, network 108 plays the notification for the call at recipient device 104. In some embodiments, the caller device receives confirmation that the recipient device is playing the notification. In some embodiments, the notification indicates that the recipient device is receiving the call. In some embodiments, the notification is an audible or haptic notification indicating that a call is being received on the recipient device, e.g., a ringtone or vibration pattern.

In some embodiments, the notification is played on the recipient device based on contextual information associated with the recipient device, the second device, and a recipient user profile associated with the recipient device and the second device. In some embodiments, the contextual information associated with the recipient device, the second device, and the recipient user profile comprises at least one of location of the recipient device; location of the second device; device-specific settings of the second device and the recipient device; time-based notification settings associated with at least one of the recipient user profile, the recipient device, or the second device; privacy settings associated with at least one of the recipient user profile, the recipient device, or the second device; preset communication settings for communications between the recipient user profile and a caller user profile associated with the caller device; combinations of the same; or the like.

In some embodiments, the device-specific settings are settings for altering at least one of the notification or the message based on the second device being headphones or a smart speaker. In some embodiments, the preset communication settings have an indication that calls from devices associated with the caller user profile can cause the generated messages (e.g., one or more preview messages) to be played on the second device. In some implementations, the privacy settings have an indication that the recipient device is in a DND mode, and at least one of the notification or the message is altered based on the indication that the recipient device is in the DND mode. In some embodiments, the privacy settings have an indication that the recipient device is in a public location, and at least one of the notification or the message is altered based on the indication that the recipient device is in a public location. In some embodiments, the notification is modified based on the noise level of the environment the recipient device is present in. For example, the notification will be a louder ringtone than usual when the recipient device is in a loud environment and/or the call (based on the contextual data) is detected to be an urgent call. In another example, the notification will be a softer ringtone, a vibration, or just a visual banner on the recipient device when the recipient device is in the DND mode, when the recipient device is at the location of their workplace, or when another device associated with the recipient device is in an online meeting.

At 124, caller device 102 transmits the message to second device 106. In some embodiments, this transmission is done using an RTP stream. At 126, network 108 plays the message at second device 106. In some embodiments, the message is translated into a preferred language of the recipient user profile. In some embodiments, 124 and 126 are executed simultaneously with 122. In some examples, 124 and 126 are executed prior to 122.

In some embodiments, the ring or message could play on recipient device 104 or second device 106. For example, the ring could play on recipient device 104 while the voice message plays on second device 106. In some embodiments, second device 106 is selected based on its proximity to the primary device. For instance, if a phone is set as recipient device 104 and a nearby smart speaker as the second device 106, the system could ensure that the ring is heard on the phone and the voice message is played on the smart speaker. In some embodiments, network 108 chooses second device 106 to play the message based on the type of device of second device 106. In some embodiments, users can specify which devices should act as secondary devices and under what conditions. For example, a user may configure the system to play the voice message on a smart speaker only when it is within a certain distance from recipient device 104. In another example, the ring could be played on a user's connected smart watch (e.g., or the ring could be a vibration on the smart watch) while the message is played on recipient device 104.

In some embodiments, the system can adjust the message based on recipient device 104's usage. For example, when the recipient is wearing headphones or streaming to speakers, the system may alter the notification to an introductory message, such as "You have a voice call from X about . . . " followed by the voice message. Such aspects ensure that the recipient has time to adjust their attention to the incoming message. In some embodiments, the device, or sensors on the device, such as accelerometers and gyroscopes, provide real-time data on the phone's movement and orientation. In some examples, this data is processed to determine whether the phone is stationary or being held, allowing the system to dynamically adjust the message delivery method accordingly. For example, if the phone is being held or is picked up during the message playback, the system can mute the audible message and display the message as text on the user interface of the phone.

In some embodiments, the system could use geo-fencing to provide contextual alerts based on the recipient's location. For example, if the recipient is near a hospital, messages from healthcare providers could be prioritized and played audibly.

Figure 1B:
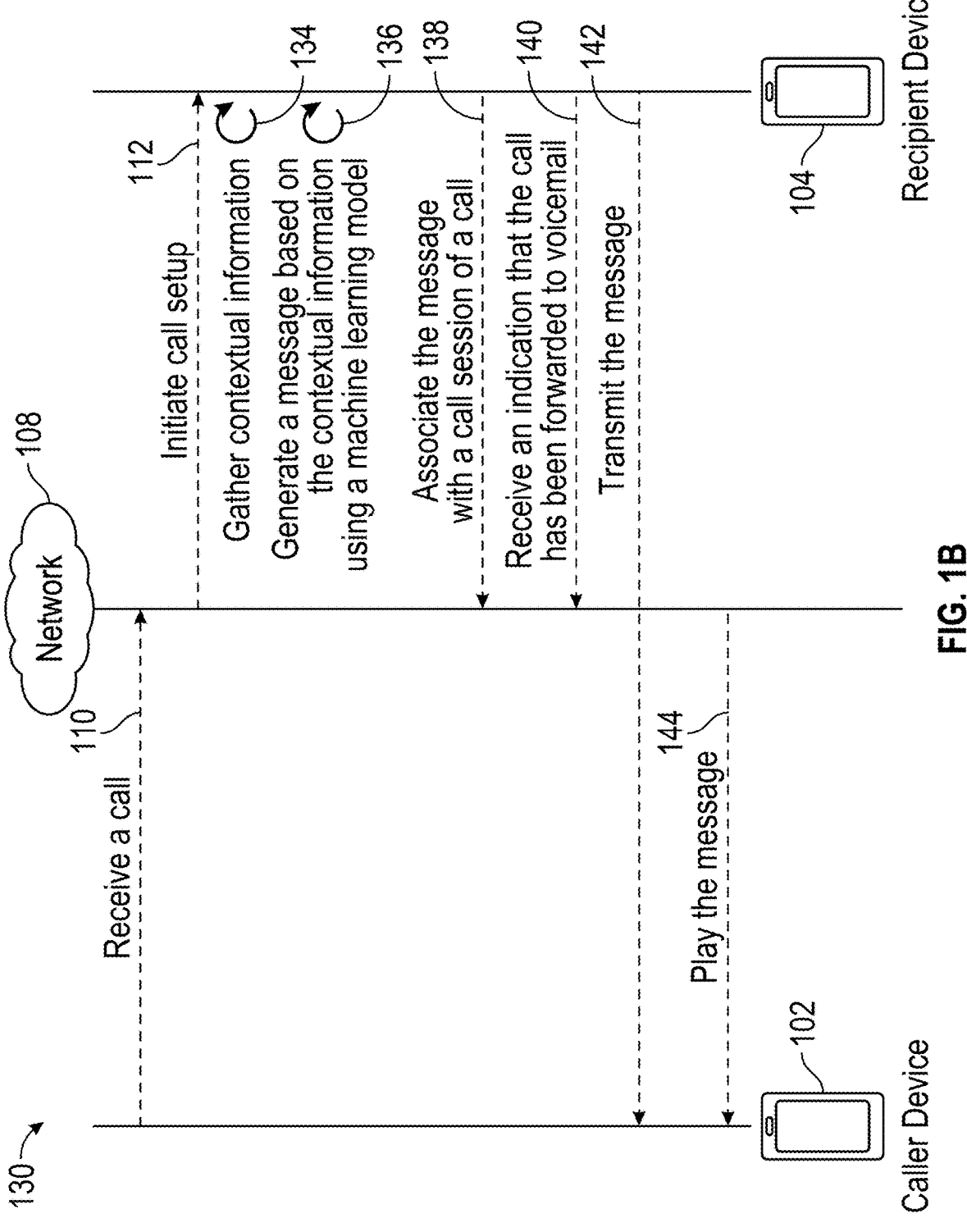
FIG. 1B is a sequence diagram of an illustrative process for real-time messaging, from a recipient device to a caller device, associated with call setup, in accordance with some embodiments of the present disclosure.

FIG. 1B is a sequence diagram of an illustrative process for real-time messaging, from a recipient device to a caller device, associated with call setup, in accordance with some embodiments of the present disclosure. In some embodiments, system 130 includes caller device 102, recipient device 104, and network 108. System 130 may include additional servers, devices, and/or networks.

In some embodiments, at 110, network 108 receives a call from caller device 102. At 112, network 108 initiates call setup at recipient device 104. At 134, recipient device 104 gathers contextual information. In some embodiments, the contextual information includes a voice recording, for example, a voice message recorded at recipient device 104. In some embodiments, the voice recording is a real-time recorded context-aware voicemail greeting generated at the recipient device by causing the microphone of the recipient device to dynamically record a first voicemail greeting and modifying the first voicemail greeting to generate the real-time recorded context-aware voicemail greeting using a combination of natural language processing and text-to-speech technologies. In some examples, the contextual information includes an urgency level assigned to the voice recording.

In some embodiments, the contextual information also includes at least one of the location of the recipient device; stored historical interaction patterns between a caller user profile associated with the caller device and a recipient user profile associated with the recipient device and the second device; privacy settings associated with at least one of the recipient user profile or the recipient device; preset communication settings for communications between the recipient user profile and the caller user profile; activity data from other devices associated with the caller user profile, such as smart watches, smart speakers, smart vehicle systems, televisions, and tablets; combinations of the same; or the like. In one example, the contextual information includes real-time activity detection data from a smart watch, such as an Apple Watch. Many smart watches are able to track whether a user is currently engaged in a workout, such as running, biking, an exercise class (e.g., yoga) or swimming and send that data to a connected device, e.g., a phone. In another example, the contextual information includes real-time data from devices that are part of a smart home system, e.g., a smart cooking appliance. Many smart cooking appliances are able to track whether a user is currently cooking and send that data to a connected device, e.g., a phone. In another example, the contextual information includes real-time data from a smart vehicle system. Many smart vehicle systems are able to track whether a user is currently driving, as well as where they are in relation to their destination and send that data to a connected device, e.g., a phone.

In some implementations, the preset communication settings for communications between the caller user profile and the recipient user profile have an indication that calls between devices associated with the caller user profile and the recipient user profile can cause the message (e.g., one or more contextual messages) to be played on the caller device. In some embodiments, the privacy settings have an indication that the recipient device is in a public location and wherein the privacy settings comprise altering the message based on the indication that the recipient device is in the public location.

At 136, recipient device 104 generates a message based on the contextual information using a machine learning model, e.g., the machine learning model as described further below with reference to FIG. 7. In one example, when the contextual information includes data from a smart watch indicating that the recipient is currently swimming, the generated message will include that the recipient is currently swimming. In some cases, the generated message will also include a prediction based on the contextual information, e.g., that the recipient device cannot answer the call because they are currently swimming. At 138, recipient device 104 associates the message with a call session of the call at network 108. At 140, network 108 receives an indication that the call has been forwarded to voicemail from recipient device 104. At 142, recipient device 104 transmits the message to caller device 102. At 144, network 108 plays the message at caller device 102. In some embodiments, playing the message at the caller device is further based on contextual information associated with the caller device and a caller user profile associated with the caller device. In some examples, the contextual information associated with the caller device and the caller user profile includes at least one of location of the caller device, time-based notification settings associated with at least one of the caller user profile or the caller device, stored historical interaction patterns between a caller user profile associated with the caller device and a recipient user profile associated with the recipient device, preset communication settings for communications between the recipient user profile and the caller user profile, privacy settings associated with at least one of the caller user profile or the caller device, combinations of the same, or the like. In some embodiments, the message is translated into a preferred language of the caller user profile.

In some embodiments, network 108 connects the call between caller device 102 and recipient device 104 and causes transmission of contextual information associated with recipient device 104. In some examples, network 108 then causes generation, at the context management system, of a message, wherein the message is at least in part based on the contextual information associated with the recipient device. In some embodiments, after network 108 receives an indication that recipient device 104 has forwarded the call to its voicemail service, network 108 transmits the message from recipient device 104 to caller device 102 and causes playing of the message at the caller device.

Figure 2:
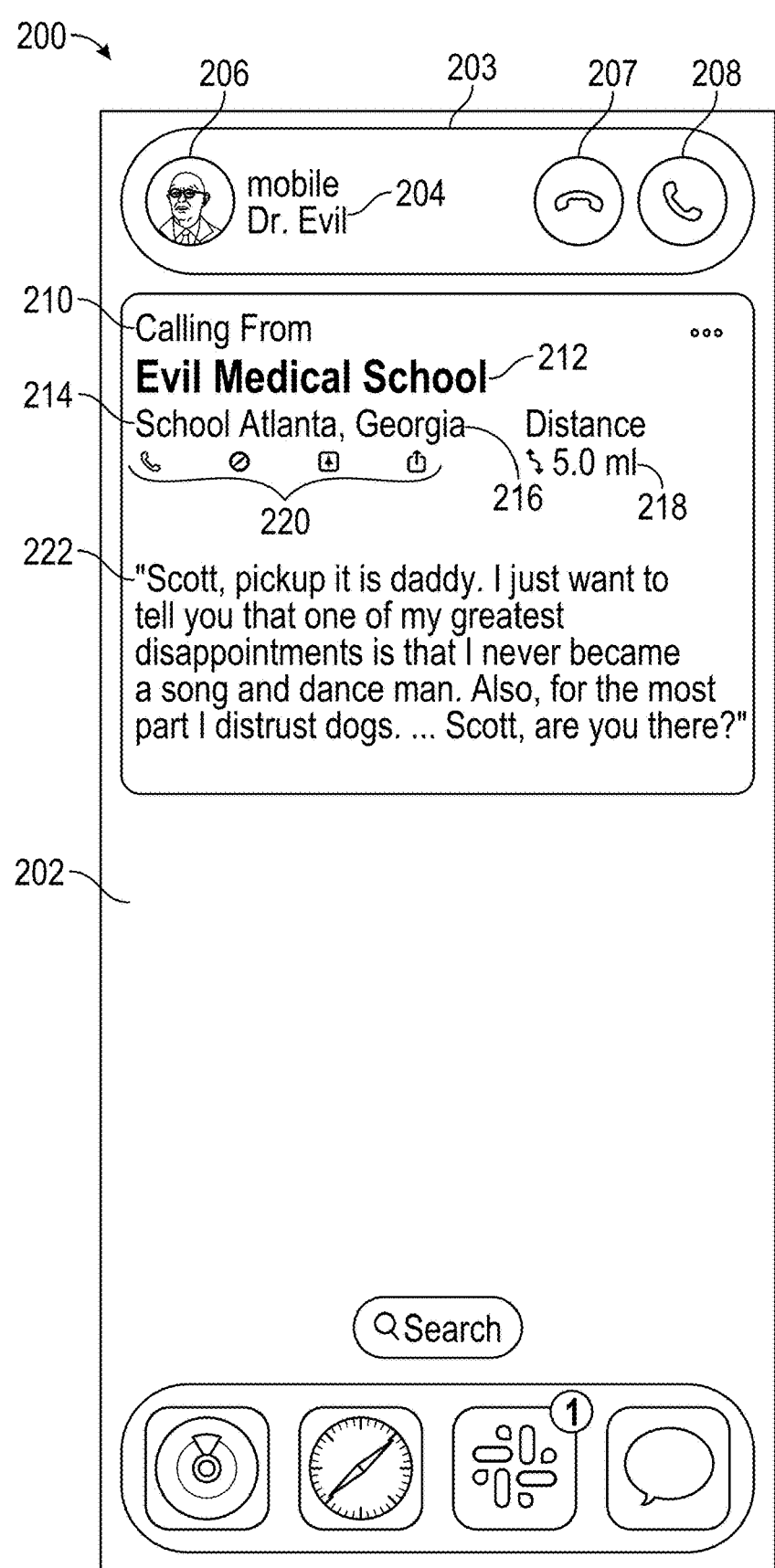
FIG. 2 is an illustrative example of real-time messaging associated with call setup, in accordance with some embodiments of the present disclosure.

FIG. 2 is an illustrative example of real-time messaging associated with call setup, in accordance with some embodiments of the present disclosure. In some embodiments, system 200 includes recipient device user interface 202. In some embodiments, recipient device user interface 202 includes call indicator 203 and caller device information card 210. In some embodiments, call indicator 203 includes caller device contact name 204, caller device contact photo 206, reject call user interface option 207, and answer call user interface option 208. In some embodiments, caller device information card 210 includes establishment caller device is calling from 212, type of establishment caller device is calling from 214, location caller device is calling from 216, distance between caller device location and recipient device location 218, establishment information user interface options 220, and message 222.

In some embodiments, the system connects a call between the caller device (e.g., caller device 102 of FIG. 1A) and the recipient device (e.g., recipient device 104 of FIG. 1A). In some embodiments, the system then causes transmission of contextual information associated with the caller device, and causes generation, at the context management system, of message 222. In some examples, message 222 is based at least in part on the contextual information associated with the caller device. In some embodiments, the system then causes transmission, from the recipient device to the caller device, of information indicating media parameters the recipient device supports and transmits audio data for the call between the caller device and the recipient device. In some implementations, the system then causes playing of a notification for the call at the recipient device, causes transmission of message 222 from the caller device to the recipient device, and causes playing of the message, e.g., a voice message, at the recipient device, e.g., on recipient device user interface 202 (which, in some examples, includes a speaker for audibly playing the voice message).

In some embodiments, recipient device user interface 202 is the user interface of the device receiving a phone call, e.g., recipient device 104 of FIG. 1A. In some implementations, call indicator 203 is generated for display on recipient device user interface 202 when the recipient device receives a call, e.g., after caller device 102 of FIG. 1A transmits audio data for the call to recipient device 104, as described further above with reference to FIG. 1A. In some embodiments, caller device contact name 204 and caller device contact photo 206 are preset by the caller device, e.g., caller device 102 of FIG. 1A, and the data representing caller device contact name 204 and caller device contact photo 206 are transmitted as media parameter information from caller device 102 to recipient device 104, as described further above with reference to FIG. 1A. In some embodiments, caller device information card 210 is generated for display on recipient device user interface 202: (1) after call indicator 203 begins to be generated for display, (2) simultaneously with an audible or haptic notification indicating that a call is being received on the recipient device, e.g., a ringtone or vibration pattern, and (3) prior to recipient device user interface 202 receiving a user selection of reject call user interface option 207 or answer call user interface option 208.

In some embodiments, establishment caller device is calling from 212, type of establishment caller device is calling from 214, location caller device is calling from 216, and distance between caller device location and recipient device location 218 are based on contextual information gathered at the caller device and transmitted as media parameter information to the recipient device, as described further above with reference to FIG. 1A.

In some embodiments, establishment information user interface options 220 include an option to call the establishment that the caller device is calling from 212 directly instead of answering the call from the caller device, an option to navigate to the establishment that the caller device is calling from 212, an option to add the establishment that the caller device is calling from 212 as a contact, and an option to share information about the establishment that the caller device is calling from 212 with another device. In some embodiments, message 222 is generated based on contextual information gathered at the caller device using a machine learning model, as described further above with reference to FIG. 1A and below with reference to FIG. 7.

In some embodiments, the system integrates with popular messaging apps to ensure seamless communication transitions between voice calls and text-based messages. In some implementations, when a caller initiates a call and sends a message, but the recipient is unable to answer the call, the system automatically generates a text message summarizing the urgency and context of the call. In some examples, this text message is then sent through the recipient's preferred messaging app, ensuring that the urgent information is conveyed even if the call is missed. In some embodiments, inversely, the recipient may use a voice command associated with call setup (e.g., while ringing) to speak a response that can be sent via text or messaging app message back to the caller's device. In some examples, this summary (e.g., for the recipient) is created using information such as the caller's identity, the urgency level, and a brief transcription of the urgent message. In some embodiments, this transcription may include contextual information such as geo location, time of day, or known activity. When calling from a device having artificial intelligence (AI) and/or large language model (LLM) capability, the message may be composed by the AI and/or LLM system, for example, predictive model 700, as described further below with reference to FIG. 7. In some embodiments, the system then uses application programming interfaces (APIs) provided by popular messaging apps to send this text message to the recipient. In some examples, the choice of messaging app can be configured based on the recipient's preferences, ensuring compatibility with apps such as WhatsApp, Facebook Messenger, or SMS. For example, if the recipient's preferred app is WhatsApp, the system uses the WhatsApp API to send the text message. In some embodiments, if the recipient's device supports multiple messaging apps, the system can use contextual information or user preferences to select the most appropriate app for delivering the message.

Figure 3:
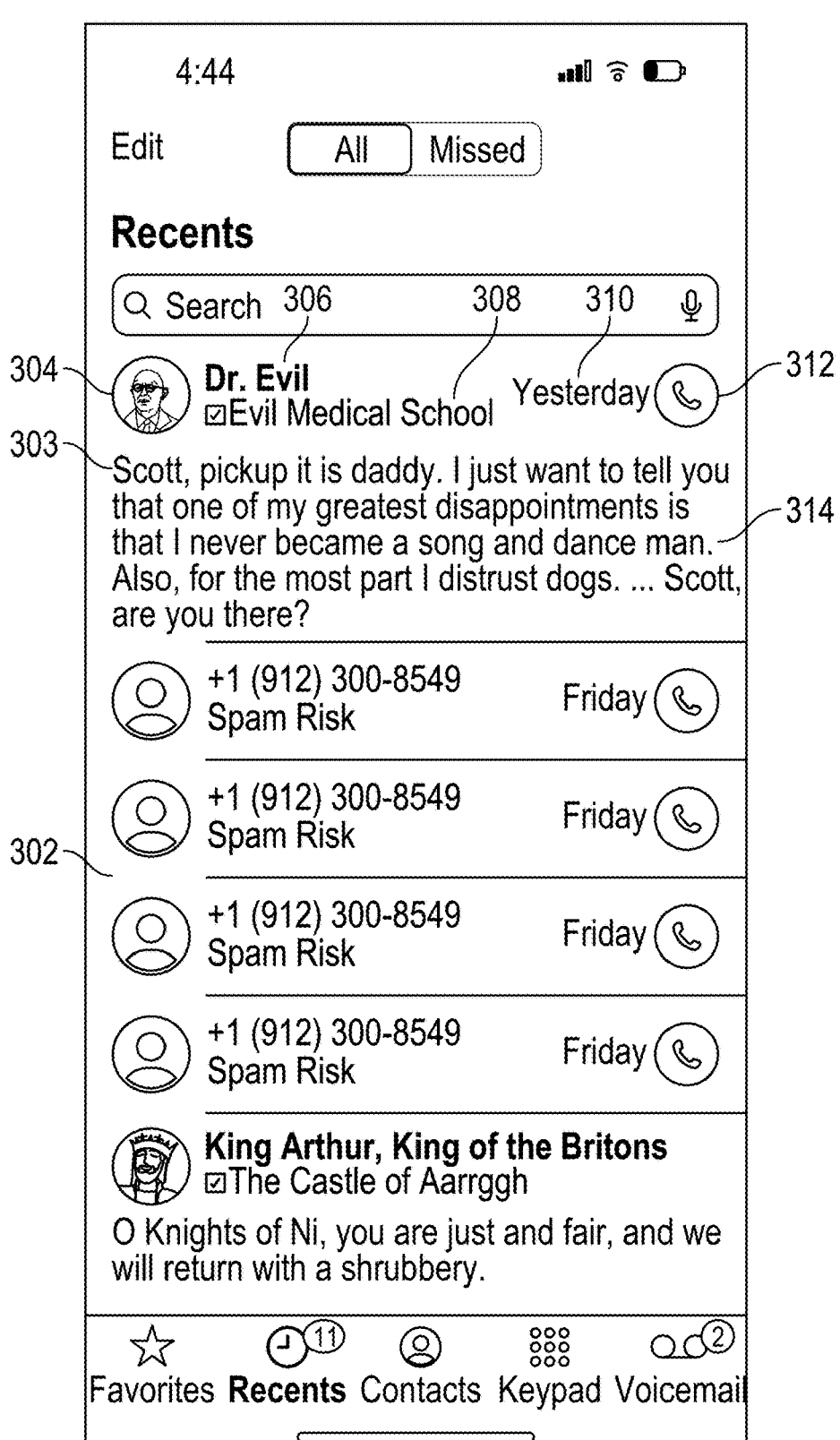
FIG. 3 is an illustrative example of a call log with logged real-time messages received associated with call setup, in accordance with some embodiments of the present disclosure.

FIG. 3 is an illustrative example of a call log with logged real-time messages received associated with call setup, in accordance with some embodiments of the present disclosure. In some embodiments, system 300 includes recipient device call log user interface 302, call indication 303, caller device contact photo 304, caller device contact name 306, establishment caller device is calling from 308, call timestamp 310, callback user interface option 312, and message 314.

In some embodiments, messages, e.g., message 314, received by the system are logged and stored in recipient device call log user interface 302 and displayed for user review. In some embodiments, the logged messages, e.g., message 314, are stored in a structured format that can be easily retrieved and displayed by a device to the user. In some embodiments, recipient device call log user interface 302 includes call indication 303, caller device contact photo 304, caller device contact name 306, establishment caller device is calling from 308, call timestamp 310, callback user interface option 312, and message 314, for each phone call with a verified caller (e.g., non-spam-risk callers).

In some embodiments, each caller device contact photo, caller device contact name, establishment caller device is calling from, and message are based on contextual information gathered at the caller device and transmitted as media parameter information to the recipient device for each respective call, as described further above with reference to FIG. 1A.

In some examples, on an Apple iPhone device, the call log involves using the Core Data framework for local data storage and iCloud for cloud storage. In some examples, Apple devices use the CallKit framework to manage and store call logs. In some examples, CallKit provides a standard way to handle call-related actions and integrates with the system's phone app to log call details. In some embodiments, when a call is made or received, CallKit logs the following information: call timestamp, e.g., call timestamp 310, caller ID, e.g., caller device contact photo 304, caller device contact name 306, call duration, and call type (e.g., incoming, outgoing, missed, or the like). In some embodiments, call logs are stored locally on the device, e.g., recipient device 104 of FIG. 1A, using Core Data, Apple's framework for managing the model layer objects in applications. In some examples, Core Data provides object graph management and persistence, allowing data to be stored in an SQLite database, binary, or XML format. In some embodiments, during a call, or during call initiation, messages and transcripts can be captured and stored similarly to call logs. In some embodiments, when the user requests to view the logged messages through the user interface on their device, the user interface retrieves the logged messages from the message log. In some embodiments, the message log fetches the messages from local storage (Core Data) and cloud storage (iCloud), and the logged messages are then displayed to the device for the user to review.

FIG. 4 is a flowchart of an illustrative process for real-time messaging, from a caller device to recipient devices, associated with call setup, in accordance with some embodiments of the present disclosure. In some embodiments, the steps outlined in process 400 are performed by one or more servers and devices of FIG. 8. For example, non-transitory memories of one or more components of the server and devices of FIG. 8, e.g., storage 808 and control circuitry 804, may store instructions that, when executed by the server and devices of FIG. 8 (as described further below with reference to FIG. 8) cause execution of the process depicted in FIG. 4. The actions and descriptions of FIG. 4 may be used with any other embodiment of this disclosure. In addition, the actions and descriptions described in FIG. 4 may be done in suitable alternative orders or in parallel to further the purposes of this disclosure.

In some embodiments, at 402, control circuitry, for example, control circuitry 804 of FIG. 8, monitors, at the network (e.g., network 108 of FIG. 1A), for a call initiation signal from the caller device (e.g., caller device 102 of FIG. 1A), as described further below with reference to FIG. 6. At 404, the control circuitry determines whether the network has received a call initiation signal from the caller device, as described further below with reference to FIG. 6. In some embodiments, if the network has not received a call initiation signal from the caller device, process 400 returns to 402. In some embodiments, if the network has received a call initiation signal from the caller device, process 400 proceeds to 406.

At step 406, the control circuitry initiates, at the network, call setup at the recipient device (e.g., recipient device 104 of FIG. 1A), for example, using a Session Initiation Protocol (SIP) invite, as described further below with reference to FIG. 6. At 408, the control circuitry causes transmission, from status systems associated with the caller device to a context management system (e.g., context management system 1110 of FIG. 11), of contextual information associated with the caller device, as described further below with reference to FIG. 11. At 410, the control circuitry causes generation, using a machine learning model (for example, the machine learning model described further below with reference to FIG. 7), at the context management system, of a message, for example, message 222, as described further above with reference to FIG. 2. At 412, the control circuitry causes transmission, from the recipient device to the caller device, of information indicating media parameters the recipient device supports, as described further below with reference to FIG. 10. At 414, the control circuitry transmits audio data for the call between the caller device and the recipient device, as described further below with reference to FIG. 10. For example, the audio data for the call is the data necessary to connect the call between the two devices, if the recipient device does pick up the call, and the data for transmitting the message, if the message will be played audibly at the recipient device. At 416, the control circuitry causes playing of a notification for the call at the recipient device, as described further below with reference to FIG. 10. At 418, the control circuitry causes transmission of the message from the caller device to a second device (e.g., second device 106 of FIG. 1A), as described further below with reference to FIG. 10. At 420, the control circuitry causes playing of the message at the second device, as described further below with reference to FIG. 10.

FIG. 5 is a flowchart of an illustrative process for real-time messaging, from a recipient device to a caller device, associated with call setup, in accordance with some embodiments of the present disclosure. In some embodiments, the steps outlined in process 500 are performed by one or more servers and devices of FIG. 8. For example, non-transitory memories of one or more components of the server and devices of FIG. 8, e.g., storage 808 and control circuitry 804, may store instructions that, when executed by the server and devices of FIG. 8 (as described further below with reference to FIG. 8) cause execution of the process depicted in FIG. 5. The actions and descriptions of FIG. 5 may be used with any other embodiment of this disclosure. In addition, the actions and descriptions described in FIG. 5 may be done in suitable alternative orders or in parallel to further the purposes of this disclosure.

In some embodiments, at 502, control circuitry, for example, control circuitry 804 of FIG. 8, monitors, at the network (e.g., network 108 of FIG. 1B), for a call initiation signal from the caller device (e.g., caller device 102 of FIG. 1B), as described further below with reference to FIG. 6. At 504, the control circuitry determines whether the network has received a call initiation signal from the caller device, as described further below with reference to FIG. 6. In some embodiments, if the network has not received a call initiation signal from the caller device, process 500 returns to 502. In some embodiments, if the network has received a call initiation signal from the caller device, process 500 proceeds to 506.

At step 506, the control circuitry initiates, at the network, call setup at the recipient device (e.g., recipient device 104 of FIG. 1B), for example, using a Session Initiation Protocol (SIP) invite, as described further below with reference to FIG. 6. At 508, the control circuitry causes transmission, from status systems associated with the recipient device to a context management system (e.g., context management system 1110 of FIG. 11), of contextual information associated with the recipient device, as described further below with reference to FIG. 11. At 510, the control circuitry causes generation, using a machine learning model (for example, the machine learning model described further below with reference to FIG. 7), at the context management system, of a message, for example, message 222, as described further above with reference to FIG. 2. At 512, the control circuitry associates, at the network, the message with a call session of the call, as described further below with reference to FIG. 11. At 514, the control circuitry receives, at the network, an indication that the recipient device has forwarded the call to its voicemail service, as described further below with reference to FIG. 11. At 516, the control circuitry transmits the message from the recipient device to the caller device, as described further below with reference to FIG. 11. At 518, the control circuitry causes playing of the message at the caller device.

FIG. 6 is a flowchart of an illustrative process for initiating call setup at a recipient device using a SIP invite, in accordance with some embodiments of the present disclosure. In some embodiments, the steps outlined in process 600 are performed by one or more servers and devices of FIG. 8. For example, non-transitory memories of one or more components of the server and devices of FIG. 8, e.g., storage 808 and control circuitry 804, may store instructions that, when executed by the server and devices of FIG. 8 (as described further below with reference to FIG. 8) cause execution of the process depicted in FIG. 6. The actions and descriptions of FIG. 6 may be used with any other embodiment of this disclosure. In addition, the actions and descriptions described in FIG. 6 may be done in suitable alternative orders or in parallel to further the purposes of this disclosure.

In some embodiments, at 602, control circuitry, for example, control circuitry 804 of FIG. 8, receives, at a P-CSCF, a SIP invite including information for an offer for the call, as described further below with reference to FIG. 10. At 604, the control circuitry determines, at the application provider server of the application provider of the recipient device, that real-time messaging associated with call setup is an enabled feature on the recipient device, as described further below with reference to FIG. 10. At 606, the control circuitry transmits confirmation, to the caller device, that real-time messaging associated with call setup is an enabled feature on the recipient device. as described further below with reference to FIG. 10.

Figure 7:
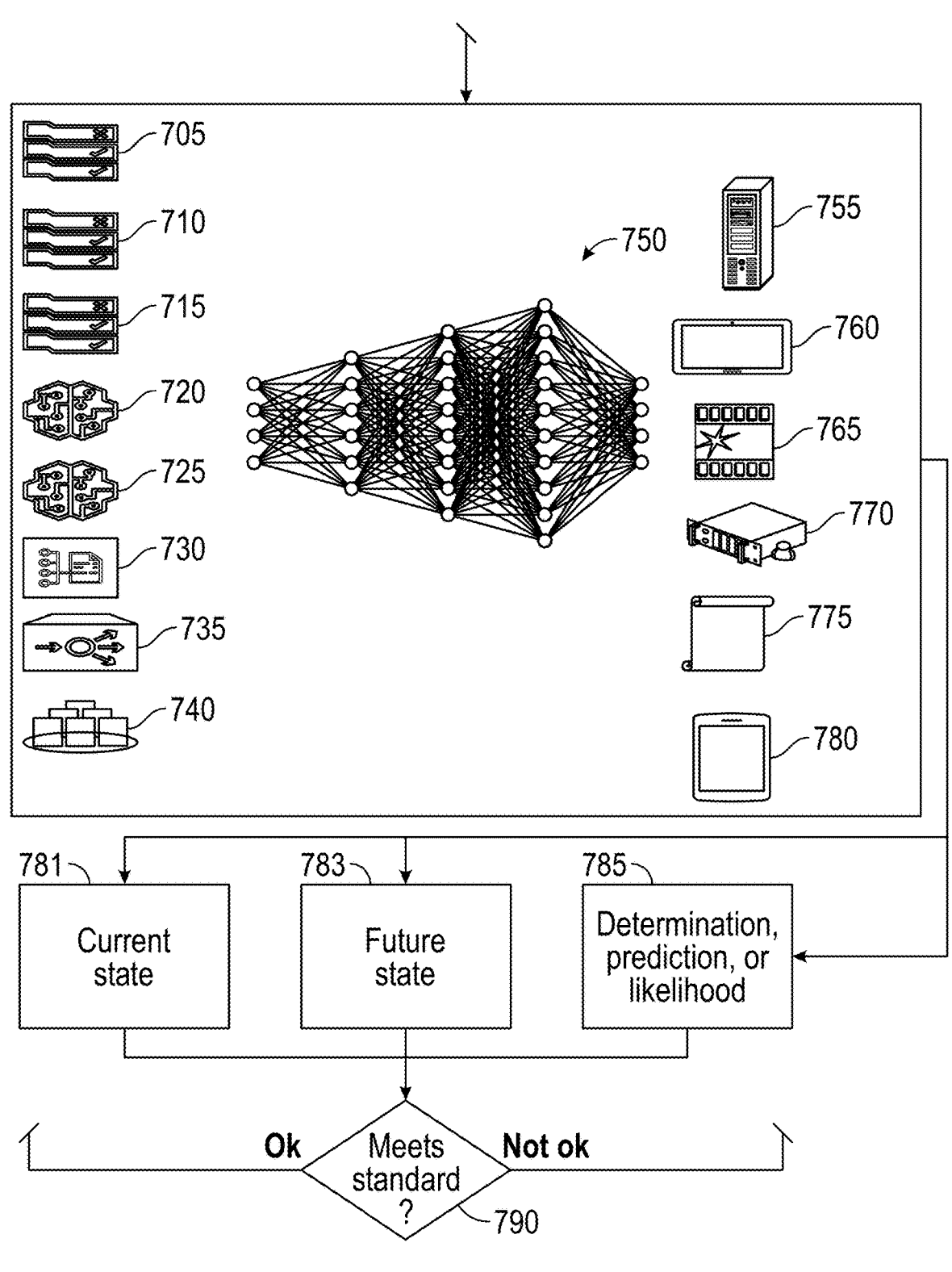
FIG. 7 is an example of an artificial intelligence system, in accordance with some embodiments of the present disclosure.

FIG. 7 is an example of an artificial intelligence system, in accordance with some embodiments of the present disclosure. In some embodiments, one or more artificial intelligence (AI) models and/or tools are employed to enhance the functionality disclosed herein. The one or more AI models and/or tools are provided for causing generation of a message and/or a greeting, e.g., at 116 of FIG. 1A, 136 of FIG. 1B, 410 of FIG. 4, 510 of FIG. 5, and 1156 of FIG. 11.

For example, AI systems are provided to process large amounts of contextual data, recognize patterns, and output generated messages based on the analyzed data. Further, for example, AI methods comprise at least one of machine learning, deep learning, natural language processing, computer vision, combinations of the same, or the like. In addition, for example, models are trained by applying the AI methods to data. Moreover, for example, the trained models are configured to provide determinations, predictions, and likelihoods based on data inputs.

By integrating AI systems, methods, and trained models, the system provides intelligent, dynamically generated, context-aware messages for enhancing the functionality of communications, e.g., for cellular calling applications.

Throughout the present disclosure, in some embodiments, determinations, predictions, likelihoods, and the like are determined with one or more predictive models. In some embodiments, the model receives various forms of data about users, applications, media content items, devices, and more. This includes usage data, load-balancing data, and metadata. The model performs analysis based on hard rules, learning rules, hard models, learning models, usage data, load data, analytics, metadata, profile information, or combinations of these. The model outputs predictions of a future state of any of the devices described. Load-increasing events are determined by load-balancing processes. The model is based on inputs including hard rules, user-defined rules, rules defined by content providers, hard models, learning models, or combinations of these. The model is trained with data using various data processes, analytical processes, and machine learning approaches. It includes regression and classification analyses. An example of a multi-layer neural network is provided. The model is based on data engineering and modeling processes, and is operationalized using registration, deployment, monitoring, and retraining processes. The model is configured to output results to one or multiple devices, which can perform various functions. The devices can be a server, tablet, media display device, network-connected computer, media device, computing device, or combinations of these. The model outputs a current state, future state, determination, prediction, or likelihood. These outputs may be compared to a predetermined or determined standard. If the standard is satisfied or rejected, the predictive process outputs at least one of the current state, future state, determination, prediction, or likelihood to any device or module disclosed.

In some embodiments, the model ingests diverse forms of data about users, applications, media content items, devices, and more. This encompasses user interaction data, load-distribution data, and metadata. The model conducts analysis based on deterministic rules, learned rules, deterministic models, learned models, user interaction data, load data, analytics, metadata, user profile information, or combinations thereof. The model generates predictions of a future state of any of the described devices. Load-increasing events are identified by load-distribution processes.

The model is constructed based on inputs including deterministic rules, user-defined rules, rules defined by content providers, deterministic models, learned models, or combinations thereof. The model is trained with data using various data processing methods, analytical processes, and machine learning techniques. It includes regression and classification analyses. An example of a deep neural network is provided.

The model is built upon data engineering and modeling processes and is operationalized using registration, deployment, monitoring, and retraining processes. The model is designed to output results to one or multiple devices, which can perform various functions. The devices can be a server, tablet, digital display device, network-connected computer, media device, computing device, or combinations thereof.

The model outputs a current state, future state, determination, prediction, or probability. These outputs may be compared to a predetermined or determined benchmark. If the benchmark is met or not met, the predictive process outputs at least one of the current state, future state, determination, prediction, or probability to any device or module disclosed.

For example, FIG. 7 depicts a predictive model. A prediction process 700 includes a predictive model 750 in some embodiments. The predictive model 750 receives as input various forms of data about one, more or all the users, applications, media content items, devices, and data described in the present disclosure. The predictive model 750 performs analysis based on at least one of hard rules, learning rules, hard models, learning models, usage data, load data, analytics of the same, metadata, profile information, combinations of the same, or the like. The predictive model 750 outputs one or more predictions of a future state of any of the devices described in the present disclosure. A load-increasing event is determined by load-balancing processes, e.g., least connection, least bandwidth, round robin, server response time, weighted versions of the same, resource-based processes, and address hashing. The predictive model 750 is based on input including at least one of a hard rule 705, a user-defined rule 710, a rule defined by a content provider 715, a hard model 720, a learning model 725, combinations of the same, or the like.

The predictive model 750 receives as input usage data 730. The predictive model 750 is based, in some embodiments, on at least one of a usage pattern of the user or media device, a usage pattern of the requesting media device, a usage pattern of the media content item, a usage pattern of the communication system or network, a usage pattern of the profile, a usage pattern of the media device, combinations of the same, or the like.

The predictive model 750 receives as input load-balancing data 735. The predictive model 750 is based on at least one of load data of the display device, load data of the requesting media device, load data of the media content item, load data of the communication system or network, load data of the profile, load data of the media device, combinations of the same, or the like.

The predictive model 750 receives as input metadata 740. The predictive model 750 is based on at least one of metadata of the streaming service, metadata of the requesting media device, metadata of the media content item, metadata of the communication system or network, metadata of the profile, metadata of the media device, combinations of the same, or the like. The metadata includes information of the type represented in the media device manifest.

The predictive model 750 is trained with data. The training data is developed in some embodiments using one or more data processes including but not limited to data selection, data sourcing, and data synthesis. The predictive model 750 is trained in some embodiments with one or more analytical processes including but not limited to classification and regression trees (CARTs), discrete choice models, linear regression models, logistic regression, logit versus probit, multinomial logistic regression, multivariate adaptive regression splines, probit regression, regression processes, survival or duration analysis, and time series models. The predictive model 750 is trained in some embodiments with one or more machine learning approaches including but not limited to supervised learning, unsupervised learning, semi-supervised learning, reinforcement learning, and dimensionality reduction. The predictive model 750 in some embodiments includes regression analysis including analysis of variance (ANOVA), linear regression, logistic regression, ridge regression, and/or time series. The predictive model 750 in some embodiments includes classification analysis including decision trees and/or neural networks. In FIG. 7, a depiction of a multi-layer neural network is provided as a non-limiting example of a predictive model 750, the neural network including an input layer (left side), three hidden layers (middle), and an output layer (right side) with 32 neurons and 192 edges, which is intended to be illustrative, not limiting. The predictive model 750 is based on data engineering and/or modeling processes. The data engineering processes include exploration, cleaning, normalizing, feature engineering, and scaling. The modeling processes include model selection, training, evaluation, and tuning. The predictive model 750 is operationalized using registration, deployment, monitoring, and/or retraining processes.

The predictive model 750 is configured to output results to a device or multiple devices. The device includes means for performing one, more, or all the features referenced herein of the systems, methods, processes, and outputs of one or more of FIGS. 1A-6 and 10-20, in any suitable combination. The device is at least one of a server 755, a tablet 760, a media display device 765, a network-connected computer 770, a media device 775, a computing device 780, combinations of the same, or the like.

The predictive model 750 is configured to output a current state 781, and/or a future state 783, and/or a determination, a prediction, or a likelihood 785, and the like. The current state 781, and/or the future state 783, and/or the determination, the prediction, or the likelihood 785, and the like may be compared 790 to a predetermined or determined standard. In some embodiments, the standard is satisfied (790=OK) or rejected (790=NOT OK). If the standard is satisfied or rejected, the predictive process 700 outputs at least one of the current state, the future state, the determination, the prediction, or the likelihood to any device or module disclosed herein, combinations of the same, or the like. In some embodiments, the predictive model 750 incorporates one or more LLMs.

FIG. 8 describes exemplary devices, systems, servers, and related hardware for real time voice messaging associated with call setup, in accordance with some embodiments of the present disclosure. FIG. 8 shows generalized embodiments of illustrative devices 800 and 801. For example, devices 800 and 801 may be smartphone devices, laptops, televisions (e.g., user device 116 of FIG. 1), smart televisions, streaming sticks, smart speakers, or voice assistants. Device 801 may include set-top box 816. Set-top box 816 may be communicatively connected to microphone 818, speaker 814, and display 812. In some embodiments, microphone 818 may receive voice commands. In some embodiments, display 812 may be a television display or a computer display. In some embodiments, set-top box 816 may be communicatively connected to user input interface 810. In some embodiments, user input interface 810 may be a remote-control device. Set-top box 816 may include one or more circuit boards. In some embodiments, the circuit boards may include processing circuitry, control circuitry, and storage (e.g., RAM, ROM, Hard Disk, Removable Disk, etc.). In some embodiments, the circuit boards may include an input/output path. More specific implementations of devices are discussed below in connection with FIG. 8. Each one of devices 800 and 801 may receive content and data via input/output ("I/O") path 802. I/O path 802 may provide content (e.g., broadcast programming, on-demand programming, internet content, content available over a local area network (LAN) or wide area network (WAN), and/or other content) and data to control circuitry 804, which includes processing circuitry 806 and storage 608. Control circuitry 804 may be used to send and receive commands, requests, and other suitable data using I/O path 802, which may comprise I/O circuitry. I/O path 802 may connect control circuitry 804 (and specifically processing circuitry 606) to one or more communications paths (described below). I/O functions may be provided by one or more of these communications paths but are shown as a single path in FIG. 8 to avoid overcomplicating the drawing.

Control circuitry 804 may be based on any suitable processing circuitry such as processing circuitry 806. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quadcore, hexa-core, or any suitable number of cores) or super-computer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 804 executes instructions for a media application stored in memory (i.e., storage 808). Specifically, control circuitry 804 may be instructed by the media application to perform the functions discussed above and below. In some implementations, any action performed by control circuitry 804 may be based on instructions received from the media application.

In client/server-based embodiments, control circuitry 804 may include communications circuitry suitable for communicating with a media application server or other networks or servers. The instructions for carrying out the above-mentioned functionality may be stored on a server (e.g., which is described in more detail in connection with FIG. 8). Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the internet or any other suitable communication networks or paths (e.g., which is described in more detail in connection with FIG. 8). In addition, communications circuitry may include circuitry that enables peer-to-peer communication of devices, or communication of devices in locations remote from each other (e.g., described in more detail below).

Memory may be an electronic storage device provided as storage 808 that is part of control circuitry 804. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 808 may be used to store various types of content described herein as well as media application data described above. Nonvolatile memory may also be used (e.g., to launch a boot-up routine and other instructions). Cloud-based storage, described in relation to FIG. 8, may be used to supplement storage 808 or instead of storage 808.

Control circuitry 804 may include video generating circuitry and tuning circuitry, such as one or more analog tuners, one or more MPEG-4 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 804 may also include scaler circuitry for upconverting and downconverting content into the preferred output format of device 800. Circuitry 804 may also include digital-to-analog converter circuitry and analog-to-digital converter circuitry for converting between digital and analog signals. The tuning and encoding circuitry may be used by device 800, 801 to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 808 is provided as a separate device from device 800, the tuning and encoding circuitry (e.g., including multiple tuners) may be associated with storage 808.

A user may send instructions to control circuitry 804 using user input interface 810. User input interface 810 may be any suitable user interface, such as a remote control, mouse, trackball, keypad, keyboard, touch screen, touchpad, stylus input, joystick, voice recognition interface, or other user input interfaces. Display 812 may be provided as a stand-alone device or integrated with other elements of each one of device 800 and device 601. For example, display 812 may be a touchscreen or touch-sensitive display. In such circumstances, user input interface 810 may be integrated with or combined with display 812. Display 812 may be one or more of a monitor, a television, a display for a mobile device, or any other type of display. A video card or graphics card may generate the output to display 812. The video card may be any processing circuitry described above in relation to control circuitry 804. The video card may be integrated with the control circuitry 804. Speakers 814 may be provided as integrated with other elements of each one of device 800 and device 801 or may be stand-alone units. The audio component of videos and other content displayed on display 812 may be played through the speakers 814. In some embodiments, the audio may be distributed to a receiver (not shown), which processes and outputs the audio via speakers 814.

The media application may be implemented using any suitable architecture. For example, it may be a stand-alone application wholly implemented on each one of device 800 and device 801. In such an approach, instructions of the application are stored locally (e.g., in storage 808), and data for use by the application is downloaded on a periodic basis (e.g., from an out-of-band feed, from an internet resource, or using another suitable approach). Control circuitry 804 may retrieve instructions of the application from storage 808 and process the instructions to rearrange the segments as discussed. Based on the processed instructions, control circuitry 804 may determine what action to perform when input is received from user input interface 810. For example, movement of a cursor on a display up/down may be indicated by the processed instructions when user input interface 810 indicates that an up/down button was selected.

In some embodiments, the media application is a client/server-based application. Data for use by a thick or thin client implemented on each one of device 800 and user equipment system 801 is retrieved on-demand by issuing requests to a server remote to each one of device 800 and device 801. In one example of a client/server-based guidance application, control circuitry 804 runs a web browser that interprets web pages provided by a remote server. For example, the remote server may store the instructions for the application in a storage device. The remote server may process the stored instructions using circuitry (e.g., control circuitry 804) to perform the operations discussed in connection with FIGS. 1-7 and 10-19.

In some embodiments, the media application may be downloaded and interpreted or otherwise run by an interpreter or virtual machine (e.g., run by control circuitry 804).

In some embodiments, the media application may be encoded in the ETV Binary Interchange Format (EBIF), received by the control circuitry 804 as part of a suitable feed, and interpreted by a user agent running on control circuitry 804. For example, the media application may be an EBIF application. In some embodiments, the media application may be defined by a series of JAVA-based files that are received and run by a local virtual machine or other suitable middleware executed by control circuitry 804. In some of such embodiments (e.g., those employing MPEG-2 or other digital media encoding schemes), the media application may be, for example, encoded and transmitted in an MPEG-2 object carousel with the MPEG audio and video packets of a program.

Figure 9:
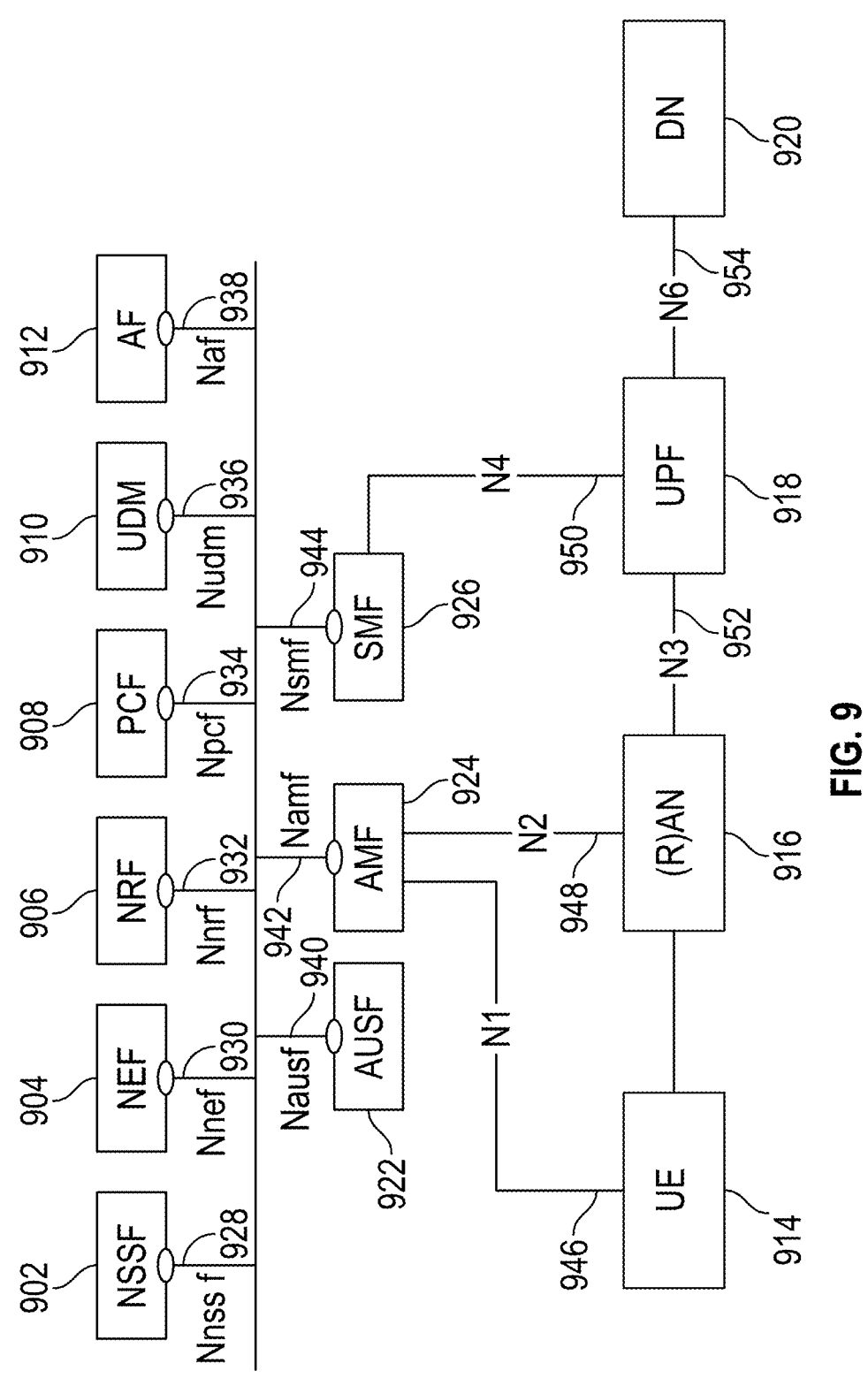
FIG. 9 is a diagram of an illustrative cellular networking system, in accordance with some embodiments of this disclosure.

FIG. 9 is a diagram of an illustrative cellular networking system, in accordance with some embodiments of this disclosure. In some embodiments, system 900 includes network slice selection function (NSSF) 902, network exposure function (NEF) 904, network repository function (NRF) 906, policy control function (PCF) 908, unified data management system (UDM) 910, application function (AF) 912, user equipment device (UE) 914, radio access network ((R)AN) 916, user plane function (UPF) 918, external data network (DN) 920, authentication server function (AUSF) 922, access and mobility management function (AMF) 924, and session management function (SMF) 926.

In some embodiments, UE 914 is composed of a mobile station and a universal subscriber identity module (USIM). In some embodiments, the main entity of (R)AN 916 is a 5G node B (gNB) radio transmitter. In some embodiments, the radio transmitter is further split up into a gNB-Central Unit (gNB-CU) and one or more gNB-Distributed Units (gNB-DU), linked by a functional split (F1) interface. In some embodiments, the 5G core network (5GC0 is here schematically represented by the AMF/UPF entity: with UPF 918 handling the user data and, in the signaling plane, AMF 924 accessing UE 914 and (R)AN 916. In some examples, the reference point between the access and the core networks is called "NG." This reference point is constituted of several interfaces (mostly N2, N3), as shown below.

In some embodiments, the 5GC architecture relies on a service-based architecture (SBA) framework, where the architecture elements are defined in terms of network functions (NFs) rather than by "traditional" network entities. In some implementations, via interfaces of a common framework, any given NF offers its services to all the other authorized NFs and/or to any "consumers" that are permitted to make use of these provided services. Such an SBA approach offers modularity and reusability.

In FIG. 9, the user plane, i.e., the NFs and elements involved in the transport of user data, is shown at the bottom level; whereas the upper part of the figure shows a plurality of NFs within a plurality of NFs within the signaling plane. In some embodiments, AF 912 controls the application. In some embodiments, SMF 926 handles the calls and sessions and contacts UPF 918 accordingly. In some embodiments, UDM 910 is functionally similar to 3G and 4G's home subscriber server (HSS) (and 2G's home location register (HLR). In some embodiments, PCF 908 ensures that the user data traffic does not exceed the negotiated bearer's capacities. In some embodiments, NRF 906 controls the other NFs by providing support for NF register, deregister, and update service to NF and their services.

Figure 10:
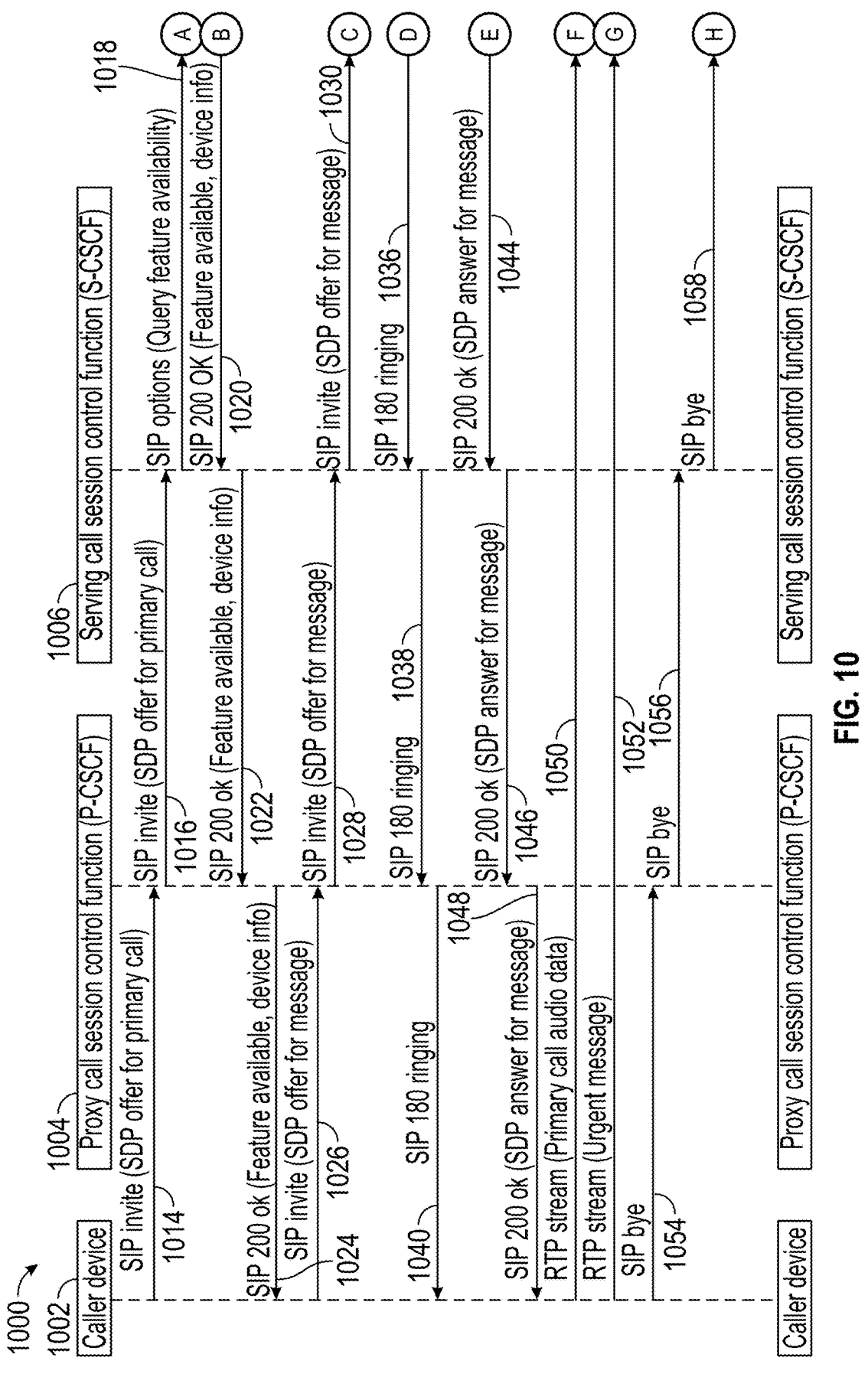
FIG. 10 is a sequence diagram of an illustrative process for real-time messaging associated with call setup, in accordance with some embodiments of the present disclosure.
Figure 10:
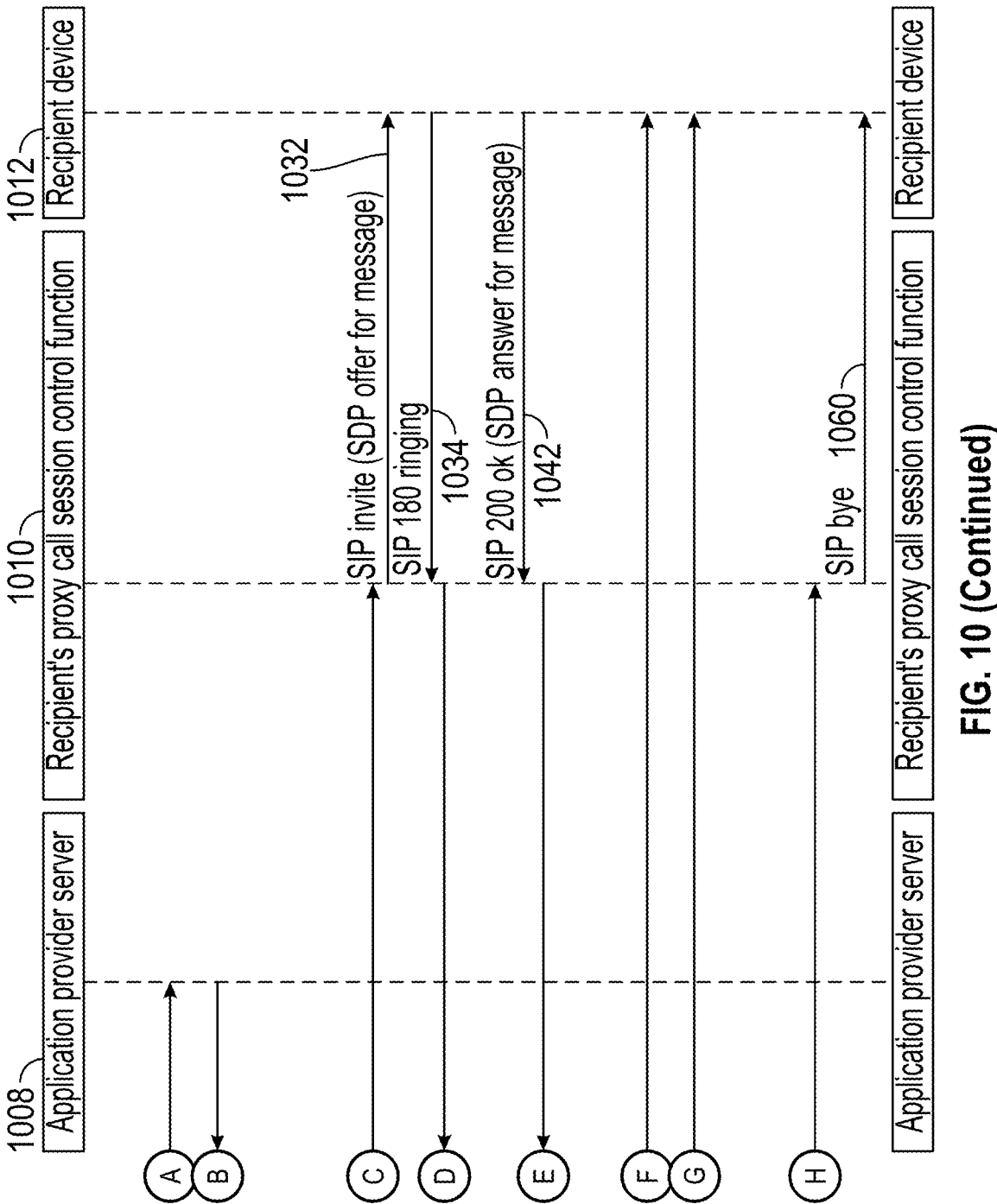

FIG. 10 is a sequence diagram of an illustrative process for real-time messaging associated with call setup, in accordance with some embodiments of the present disclosure. In some embodiments, system 1000 includes caller 1002, proxy call session control function (P-CSCF) 1004, serving call session control function (S-CSCF) 1006, application provider server 1008, recipient's proxy call session control function 1010, and recipient device 1012. System 1000 may include additional servers, devices, and/or networks.

In some embodiments, FIG. 10 depicts a system where a communication application utilizes VoNR and SIP to enable real-time messaging during the call setup phase. The process begins when a caller initiates a call to the recipient, triggering the carrier's network to start the call setup process using SIP. Before the call reaches the recipient and the first ring occurs, the carrier's network sends a SIP-based query to application provider server 1008 (e.g., an Apple server) using a SIP options request. This query determines if the feature is available, if recipient device 1012 allows it, and which devices (e.g., phone, watch) can handle the message.

In some embodiments, at 1014, caller device 1002 transmits a SIP Invite with an SDP offer for primary call to P-CSCF 1004. At 1016, P-CSCF 1004 transmits the SIP Invite with the SDP offer for primary call to S-CSCF 1006. In some embodiments, the SDP offer contains information about the media capabilities, such as codec support and transport addresses. At 1018, S-CSCF 1006 transmits SIP options with a query asking about the availability of real-time messaging associated with call setup to application provider server 1008. An example of the code representing the call is as follows:

```
OPTIONS sip:appleserver.example.com SIP/2.0
Via: SIP/2.0/UDP client.example.com:5060;branch=z9hG4bK776asdhds
Max-Forwards: 70
To: <sip:service@appleserver.example.com>
From: <sip:caller@client.example.com>;tag=1928301774
Call-ID: a84b4c76e66710
CSeq: 63104 OPTIONS
Contact: <sip:caller@client.example.com>
Accept: application/sdp
Content-Length: 0
```

The following is an example server response from the SIP options query:

```
SIP/2.0 200 OK
Via: SIP/2.0/UDP
client.example.com:5060;branch=z9hG4bK776asdhds;received=192.0.2.
1
To: <sip:service@appleserver.example.com>;tag=314159
From: <sip:caller@client.example.com>;tag=1928301774
Call-ID: a84b4c76e66710
CSeq: 63104 OPTIONS
Contact: <sip:appleserver@appleserver.example.com>
Content-Type: application/sdp
Content-Length: 154
v=0
o=- 25678 753849 IN IP4 appleserver.example.com
s=-
c=IN IP4 203.0.113.1
t=0 0
m=audio 49170 RTP/AVP 0
a=rtpmap:0 PCMU/8000
a=feature:available
a=device:phone
a=device:watch
```

In some embodiments, application provider server 1008 then checks the settings and device preferences of recipient device 1012, for example, detecting if the user is wearing their wearable using the wearable's state and connectivity status APIs such as Apple's WCSession, Healthkit, or Companion device Framework. In some embodiments, service authorization and profile handling mechanisms and application provider-specific APIs for device status are used here.

In some embodiments, the system uses preferences in the contact information to manage the ability of callers to send messages associated with call setup. This feature allows users to control which contacts can utilize the messaging associated with call setup functionality, enhancing communication security and personalization. In some embodiments, users can configure these preferences through their phone's contact settings. For example, on an Apple device, users can specify whether individual contacts or groups such as favorites are allowed to use the feature. In some embodiments, an RTP stream delivers a request message to the recipient's device, which responds with the availability of the feature. In some examples, if the recipient has enabled the feature for the caller, the caller's iPhone call app indicates that the functionality is available. This indication can be visual or auditory, confirming that the caller may create a message associated with call setup.

At 1020, application provider server 1008 transmits a SIP 200 OK signal with device information and an indication that the real-time messaging associated with call setup feature is available on the recipient device to S-CSCF 1006, when the feature is permitted, and devices are available. In some embodiments, the SIP 200 OK signal includes an SDP answer, indicating the media parameters it supports. At 1022, S-CSCF 1006 transmits the SIP 200 OK signal to P-CSCF 1004. At 1024, P-CSCF 1004 transmits the SIP 200 OK signal to caller device 1002. In some embodiments, caller device 1002 then triggers a message during call initiation through caller device 1002 detecting user speech or through a user input such as a button. At 1026, caller device 1002 transmits a SIP invite with an SDP offer for message to P-CSCF 1004. In some embodiments, the SIP invite follows SIP invite procedures specified in RFC 3261, Section 5. At 1028, P-CSCF 1004 transmits the SIP invite with the SDP offer for message to S-CSCF 1006. At 1030, S-CSCF 1006 transmits the SIP invite with the SDP offer for message to the recipient's proxy call session control function 1010. At 1032, the recipient's proxy call session control function 1010 transmits the SIP invite with the SDP offer for message to recipient device 1012.

At 1034, recipient device 1012 transmits a SIP 180 ringing signal to the recipient's proxy call session control function 1010. At 1036, the recipient's proxy call session control function 1010 transmits the SIP 180 ringing signal to S-CSCF 1006. At 1038, S-CSCF 1006 transmits the SIP 180 ringing signal to P-CSCF 1004. At 1040, P-CSCF 1004 transmits the SIP 180 ringing signal to caller device 1002. At 1042, recipient device 1012 transmits a SIP 200 OK signal with an SDP answer for message to the recipient's proxy call session control function 1010. At 1044, the recipient's proxy call session control function 1010 transmits the SIP 200 OK signal with the SDP answer for message to S-CSCF 1006. At 1046, S-CSCF 1006 transmits the SIP 200 OK signal with the SDP answer for message to P-CSCF 1004. At 1048, P-CSCF 1004 transmits the SIP 200 OK signal with the SDP answer for message to caller device 1002.

In some embodiments, the network establishes the parallel SIP session alongside the primary call setup session, managing multiple SIPs. In some embodiments, VoNR technology is employed to ensure the session is established with minimal latency, as supported by media handling over VoLTE/VoNR. At 1050, caller device 1002 transmits an RTP stream with audio data for the primary call to recipient device 1012. In some embodiments, the RTP stream ensures that audio can flow between the devices using the agreedupon parameters. In some embodiments, the RTP stream is used to transmit the voice message within the parallel SIP session. At 1052, caller device 1002 transmits an RTP stream with the urgent message to recipient device 1012.

In some embodiments, recipient device 1012, based on user preference and the SIP options response, receives the message and plays it audibly or as an enhanced caller ID while the primary call is still ringing. Recipient device 1012 uses Apple's Core Audio API for audio mixing, which may, for example, initially start the ringtone at normal volume and then adjust the volume of the ringtone when the message is played, ensuring the message can be clearly understood. In some embodiments, when the message is played, a parallel SIP session is established, following the SDP offer/answer model to negotiate media parameters specifically for the message. In some embodiments, this session also follows the SDP offer/answer model to negotiate media parameters specifically for the message. In some embodiments, recipient device 1012 uses its audio APIs to handle multiple audio streams simultaneously, initially, for example, starting with the ringtone at normal volume. In some embodiments, when the message starts playing, recipient device 1012 may adjust the ringtone volume to ensure the message can be clearly heard, involving the mixing of audio streams using APIS such as Apple's Core Audio API on iOS devices. In some embodiments, after the message ends, recipient device 1012 may restore the ringtone to its original volume if the call is still ringing and caller device 1002 no longer detects speech or if recipient device 1012 no longer detects incoming RTP streams. In some embodiments, upon hearing the message, recipient device 1012 decides whether to answer the call or let it go to voicemail, following SIP response procedures for call handling.

At 1054, caller device 1002 transmits a SIP bye signal to P-CSCF 1004. At 1056, P-CSCF 1004 transmits the SIP bye signal to S-CSCF 1006. At 1058, S-CSCF 1006 transmits the SIP bye signal to the recipient's proxy call session control function 1010. At 1060, the recipient's proxy call session control function 1010 transmits the SIP bye signal to recipient device 1012.

In some embodiments, system 1000 includes integration with smart home systems. For example, if caller device 1002 initiates a message while recipient device 1012 is at home, the system can leverage IoT devices to enhance the alert. In some embodiments, smart speakers, connected lights, or other smart home devices could be activated to ensure the message is noticed.

In some embodiments, the system allows users to pre-record messages to be delivered at specific times or under certain conditions. For example, a user may set a message to be sent to a device of a colleague if the user is running late for a meeting. In some embodiments, the system triggers this message based on the pre-set time or context, using VoNR and SIP for low-latency transmission. In some embodiments, the sequence involves the user device scheduling the message, the system storing the message with the relevant conditions and the system automatically initiating the SIP session to transmit the message at the appropriate time.

Figure 11:
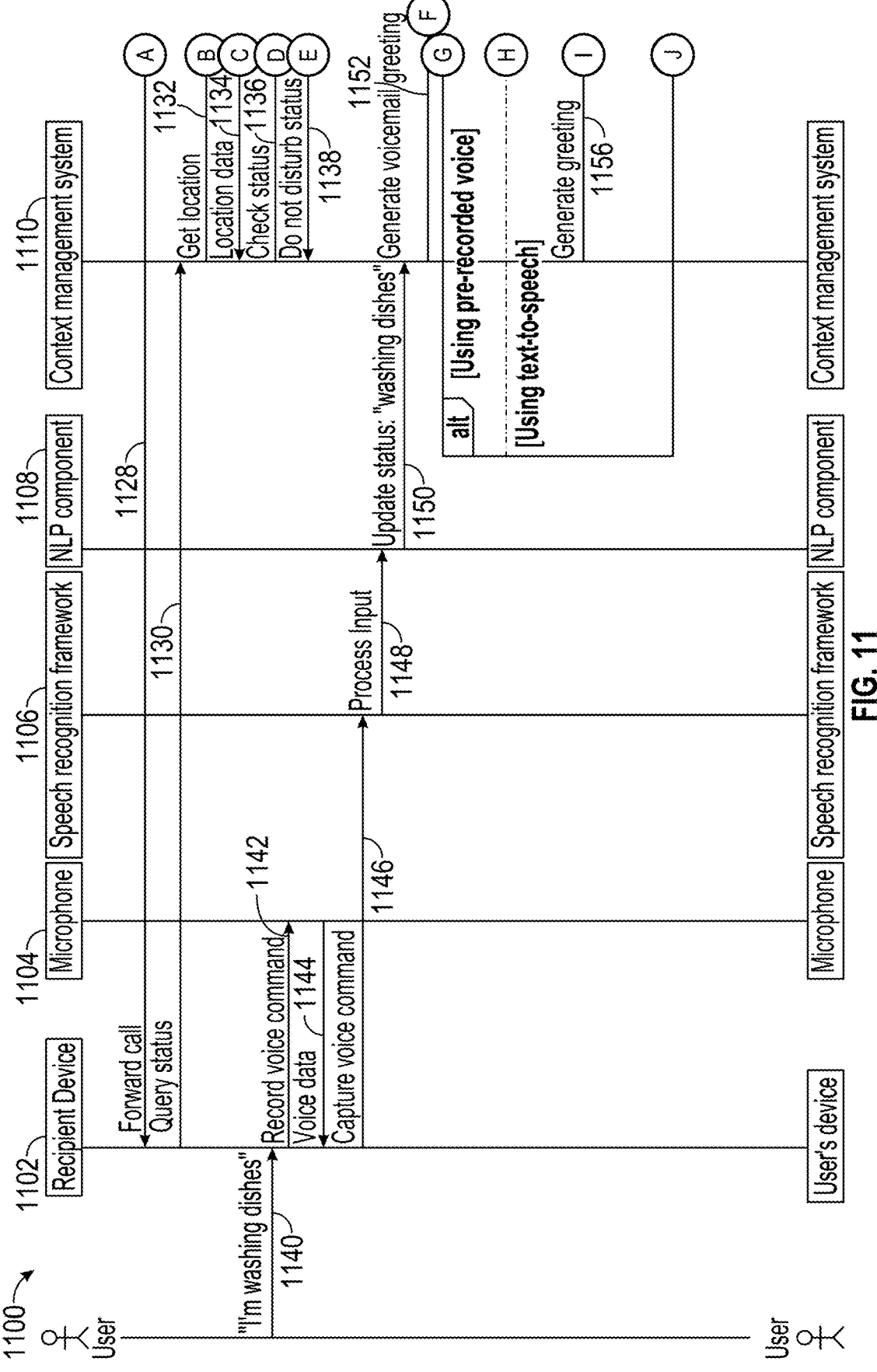
FIG. 11 is a sequence diagram of an illustrative process for real-time messaging associated with call setup with dynamic user-set context-aware voicemail greetings, in accordance with some embodiments of the present disclosure.
Figure 11:
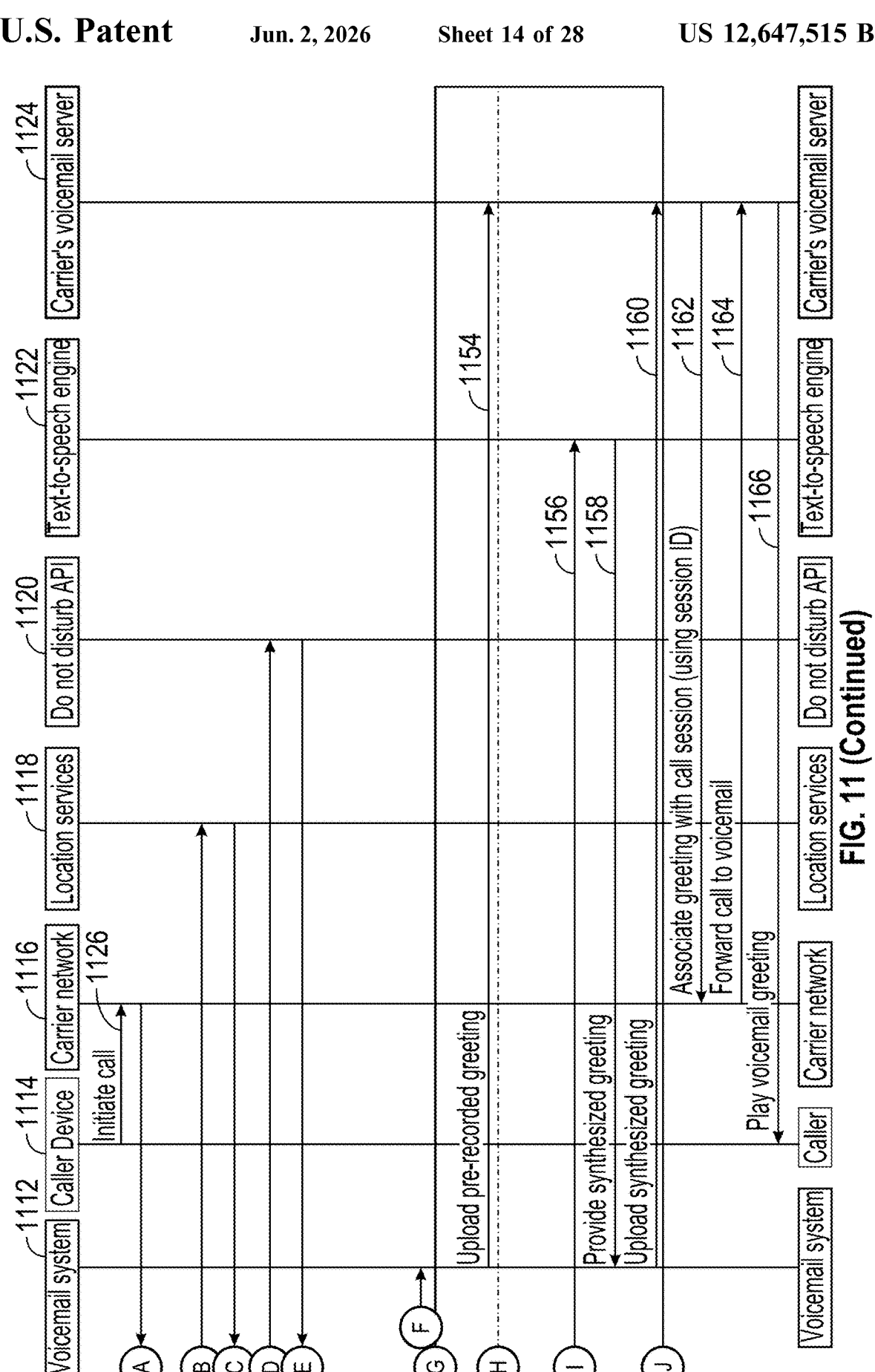

FIG. 11 is a sequence diagram of an illustrative process for real-time messaging associated with call setup with dynamic user-set context-aware voicemail greetings, in accordance with some embodiments of the present disclosure. In some embodiments, system 1100 includes recipient's device 1102, microphone 1104, speech recognition framework 1106, NLP component 1108, context management system 1110, voicemail system 1112, caller device 1114, carrier network 1116, location services 1118, DNDAPI 1120, text-to-speech engine 1122, and carrier's voicemail server 1124. System 1100 may include additional servers, devices, and/or networks.

In some embodiments, FIG. 11 depicts a system that allows users to dynamically set context-aware voicemail greetings that change based on their status or location without relying on predefined greetings. In some embodiments, the system uses real-time data and user inputs to generate appropriate voicemail messages on the fly. In some embodiments, this process can occur in real time, even while the phone is ringing. In some examples, the system allows users to dynamically set context-aware voicemail greetings based on real-time activity detection from wearable devices, such as an Apple Watch. In some examples, this feature provides callers with accurate and up-to-date information about the recipient's current activity. In some embodiments, when the user is wearing a wearable device, such as an Apple Watch, the wearable device continuously monitors their activity. In some embodiments, the wearable device detects when the user is exercising through its integrated sensors and activity recognition algorithms. In some implementations, this activity status is then communicated to the user's phone. In some embodiments, when caller device 1114 reaches recipient device 1102's voicemail, the system evaluates the recipient device 1102's current context using the data from the wearable device. If the user is detected to be exercising, the system dynamically generates a voicemail greeting that reflects this status, such as "User can't answer the phone because they are exercising."

In some embodiments, at 1126, caller device 1114 initiates a call at carrier network 1116. At 1128, carrier network 1116 forwards the call to recipient device 1102. At 1130, recipient device 1102 queries about status information from context management system 1110. For example, when the call comes in, the user's device immediately starts evaluating the recipient's current context using integrated sensors and data sources, e.g., location services 1118 and DND API 1120. For example, this includes checking the recipient's manual status updates, the device's GPS for location information using location services, and the device's current do-not-disturb status using relevant APIs such as Apples Callkit. At 1132, context management system 1110 receives location information from location services 1118. At 1134, location services 1118 receives location data from context management system 1110. At 1136, context management system 1110 checks the status of DND API 1120. At 1138, DND API 1120 sends a current DND status to context management system 1110. In some embodiments, recipient device 1102 listens for any voice utterances or commands from a user, such as "I'm washing dishes," using a speech recognition framework for voice recognition. At 1140, recipient device 1102 receives the voice utterance or command "I'm washing dishes." At 1142, recipient device 1102 records the voice utterance or command using microphone 1104. At 1144, microphone 1104 sends voice data back to the user device. At 1146, recipient device 1102 captures the voice utterance or command and sends it to speech recognition framework 1106. At 1148, speech recognition framework 1106 sends the voice utterance or command to NLP component 1108 as an input for processing. In some implementations, this voice utterance or command is processed in real time by NLP component 1108 to understand the context. In some examples, NLP component 1108 is part of a machine learning model, e.g., predictive model 700, as described further above with reference to FIG. 7. In some examples, to dynamically record the outgoing voicemail greeting, recipient device 1102 can use the user's pre-recorded voice, generate the greeting using a combination of NLP and text-to-speech technologies, or access the recipient device's microphone to record in real time. In some cases, the recorded message may be "cleaned up" by NLP component 1108 or an LLM. At 1150, NLP component 1108 updates the status at context management system 1110 to be "Washing Dishes." At 1152, context management system 1110 generates a voicemail greeting for voicemail system 1112. In some examples, the dynamically generated voicemail greeting (e.g., either pre-recorded or synthesized) is then uploaded to the carrier's voicemail servers and associated with the incoming call (e.g., using call session IDs), by sending the greeting data to the voicemail servers using secure APIs provided by the carrier.

In some embodiments, when the system determines a pre-recorded voice command initially received at the user device is sufficient, at 1154, voicemail system 1112 uploads the pre-recorded greeting to the carrier's voicemail server 1124.

In some embodiments, when the system determines the pre-recorded voice command initially received at the user device is not sufficient, at 1156, context management system 1110 generates a greeting using text to speech at text-to-speech engine 1122. In some embodiments, at 1158, text-to-speech engine 1122 provides the synthesized greeting to voicemail system 1112. In some embodiments, at 1160, voicemail system 1112 uploads the synthesized greeting to the carrier's voicemail server 1124.

At 1162, the carrier's voicemail server 1124 associates the greeting with the call session of the call, using session ID, at carrier network 1116. At 1164, carrier network 1116 forwards the call to voicemail at the carrier's voicemail server 1124. At 1166, carrier's voicemail server 1124 plays the voicemail greeting at the caller device 1114.

Figure 12:
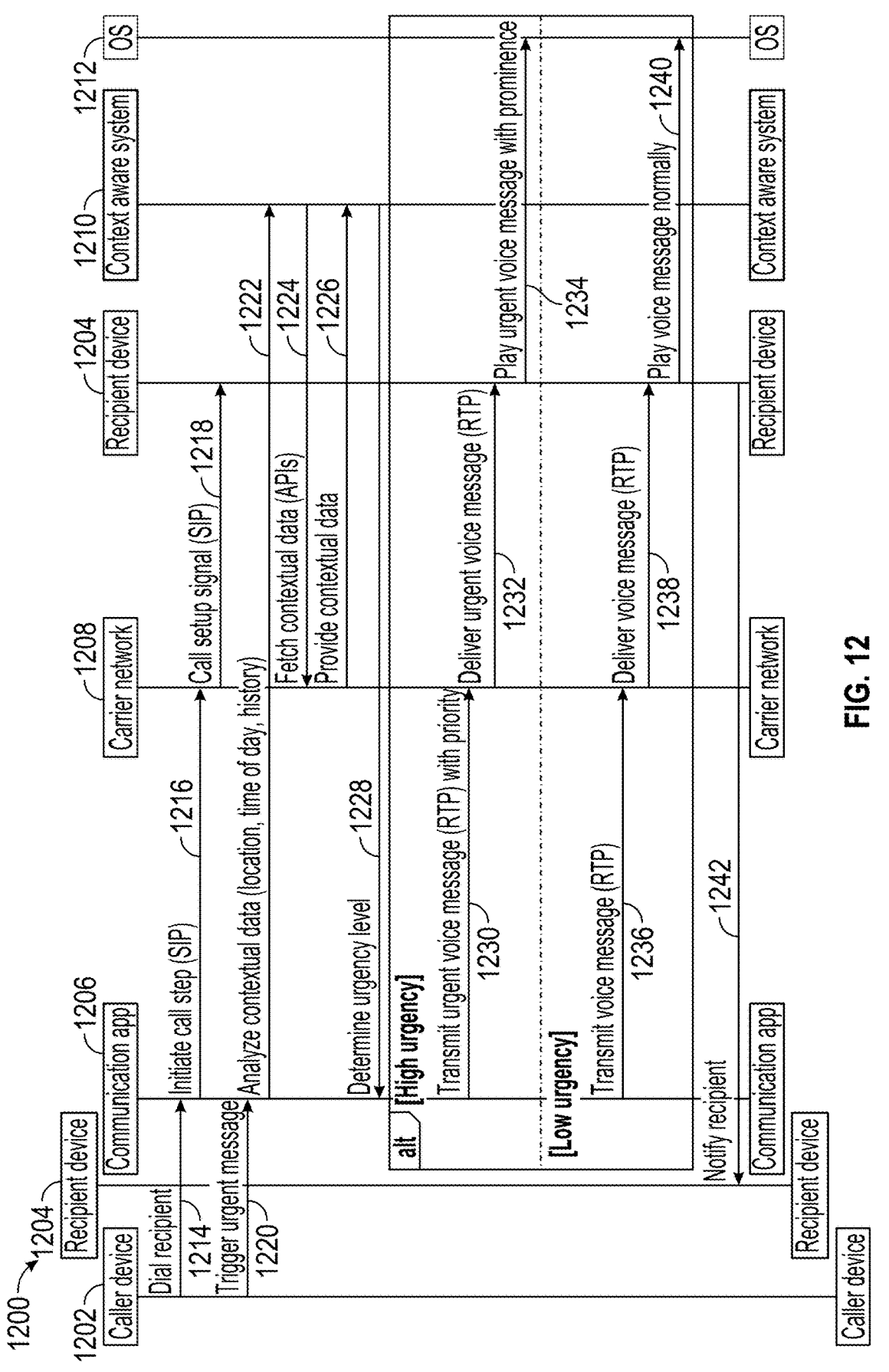
FIG. 12 is a sequence diagram of an illustrative process for real-time messaging associated with call setup with integrated context-aware algorithms to enhance the urgency and relevance of the message transmitted, in accordance with some embodiments of the present disclosure.

FIG. 12 is a sequence diagram of an illustrative process for real-time messaging associated with call setup with integrated context-aware algorithms to enhance the urgency and relevance of the message transmitted, in accordance with some embodiments of the present disclosure. In some embodiments, system 1200 includes caller device 1202, recipient device 1204, communication application 1206, carrier network 1208, context-aware system 1210, and operating system (OS) 1212. In some embodiments, OS 1212 is the operating system of recipient device 1204. System 1200 may include additional servers, devices, and/or networks.

In some embodiments, FIG. 12 integrates context-aware algorithms to enhance the urgency and relevance of the message transmitted. This context-aware approach ensures that messages (e.g., high priority messages) are delivered and noticed immediately by the recipient, enhancing the decision-making process during call reception. In some embodiments, at 1214, caller device 1202 dials recipient device 1204 through communication app 1206. At 1216, communication app 1206 initiates call setup using SIP at carrier network 1208. At 1218, carrier network 1208 transmits a call setup signal using SIP to recipient device 1204. At 1220, caller device 1202 triggers an urgent message at communication app 1206. At 1222, communication app 1206 analyzes contextual data, including location, time of day, and historical communications, and transmits the contextual data to context-aware system 1210. At 1224, context-aware system 1210 fetches contextual data and information using various APIs from carrier network 1208. At 1226, carrier network 1208 provides the contextual data to context-aware system 1210. At 1228, context-aware system 1210 determines the urgency level from communication app 1206 by evaluating the contextual information. In some embodiments, the contextual data is processed in real time, utilizing carrier-provided APIs for location and behavioral analytics.

In some embodiments, when the voice message has a high urgency level, at 1230, communication app 1206 transmits an urgent voice message with priority information using an RTP stream to carrier network 1208 via the established SIP session with VoNR for low latency. In some embodiments, at 1232, carrier network 1208 delivers the urgent voice message using an RTP stream to recipient device 1204. In some embodiments, at 1234, recipient device 1204 plays the urgent voice message with prominence at OS 1212, overriding other audio streams if necessary.

In some embodiments, when the voice command has a low urgency level, at 1236, communication app 1206 transmits the voice message using an RTP stream. In some embodiments, at 1238, carrier network 1208 delivers the voice message using an RTP stream to recipient device 1204. In some embodiments, at 1240, recipient device 1204 plays the voice message normally at OS 1212.

At 1242, recipient device 1204 plays the voice message, audibly or visually, at recipient device 1204.

Figure 13:
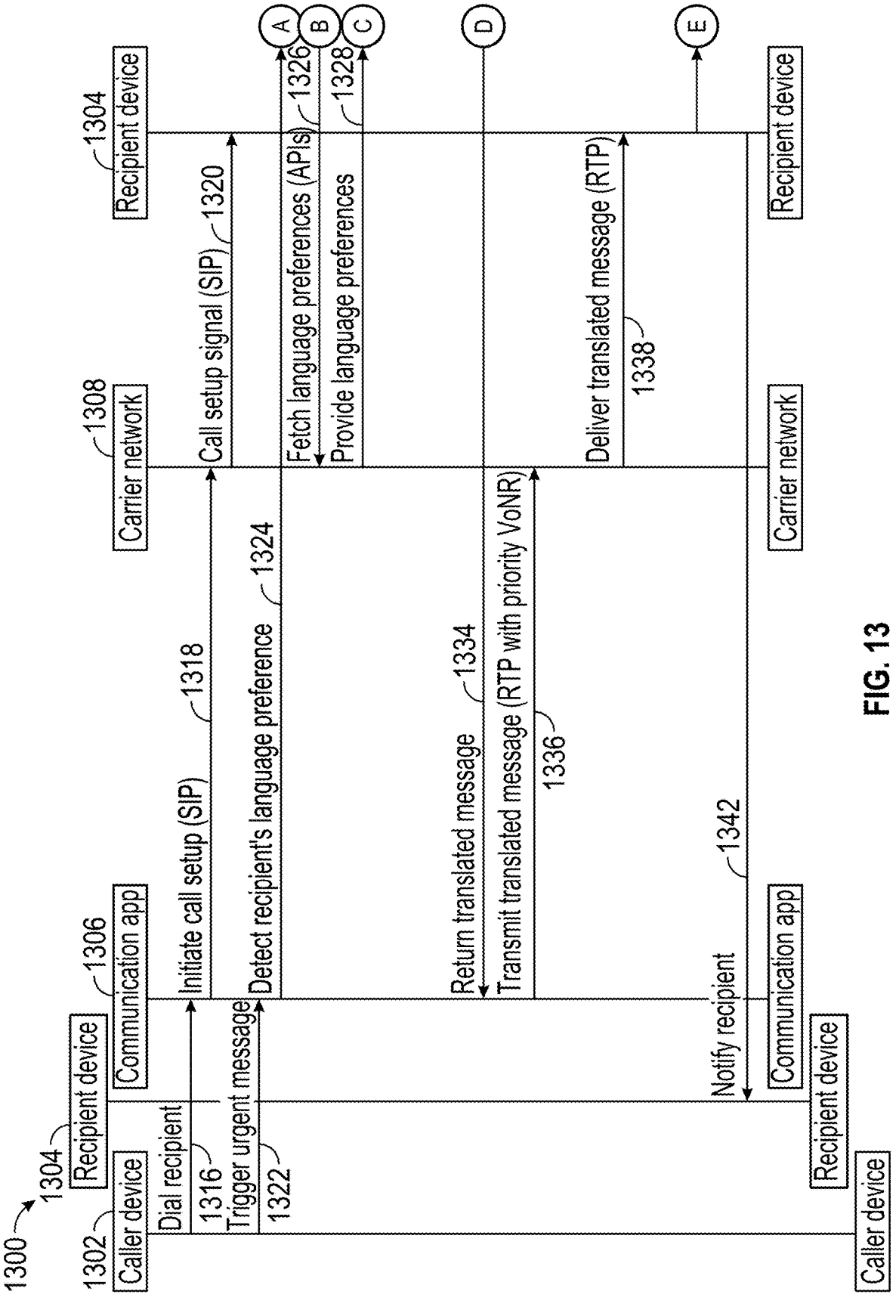
FIG. 13 is a sequence diagram of an illustrative process for real-time messaging associated with call setup with multi-language support, in accordance with some embodiments of the present disclosure.
Figure 13:
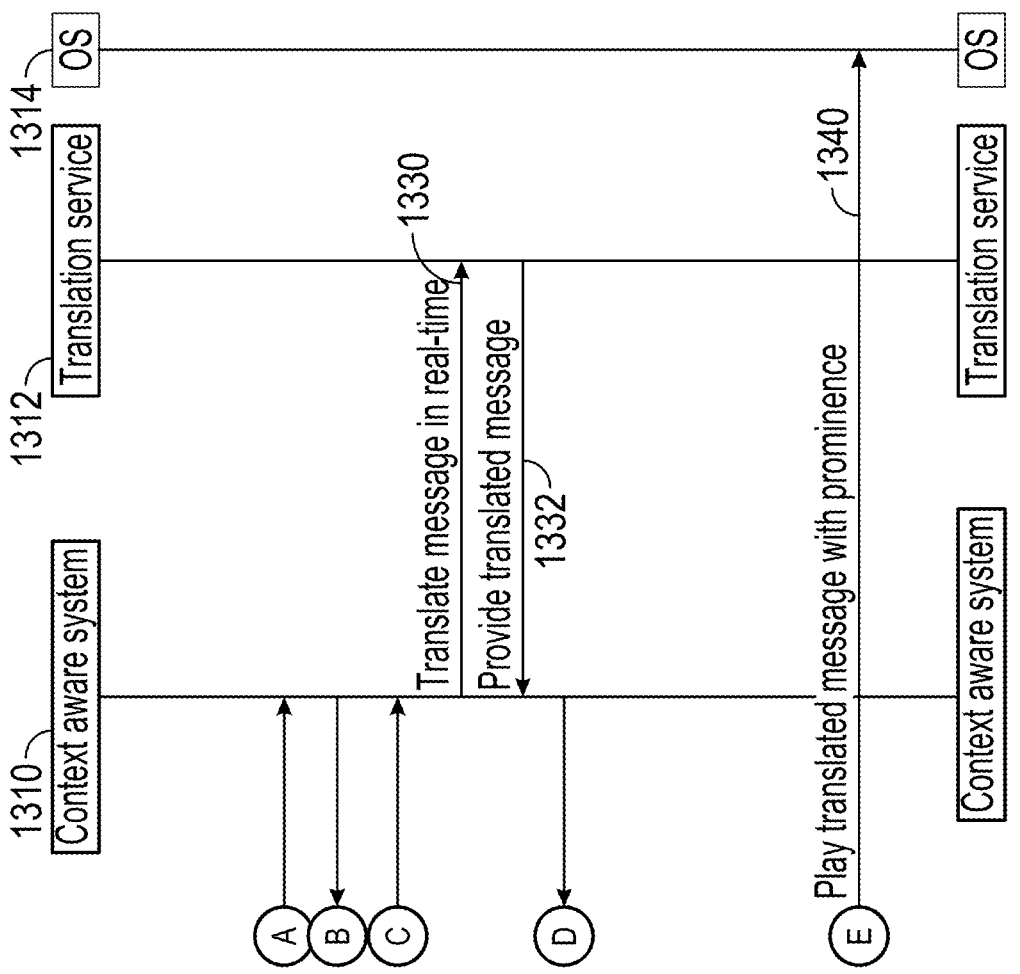

FIG. 13 is a sequence diagram of an illustrative process for real-time messaging associated with call setup with multi-language support, in accordance with some embodiments of the present disclosure. In some embodiments, system 1300 includes caller device 1302, recipient device 1304, communication application 1306, carrier network 1308, context-aware system 1310, translation service 1312, and OS 1314. In some embodiments, OS 1314 is the operating system of recipient device 1304. System 1300 may include additional servers, devices, and/or networks.

In some embodiments, FIG. 13 depicts a system featuring multi-language support for messages, allowing messages to be automatically translated into the recipient's preferred language. In some embodiments, when the caller initiates a message, the system detects the recipient's language preferences using contextual data and carrier information. In some embodiments, the message is then translated in real time using on-device processing or cloud services and transmitted using SIP and VoNR. This feature enhances the inclusivity and effectiveness of urgent communications across different languages.

In some embodiments, at 1316, caller device 1302 dials recipient device 1304 through communication app 1306. At 1318, communication app 1306 initiates call setup using SIP at carrier network 1308. At 1320, carrier network 1308 transmits a call setup signal using SIP to recipient device 1304. At 1322, caller device 1302 triggers an urgent message at communication app 1306. At 1324, communication app 1306 detects the language preference of recipient device 1304 at context-aware system 1310. At 1326, context-aware system 1310 fetches language preferences and API information from carrier network 1308. At 1328, carrier network 1308 provides language preferences to context-aware system 1310. At 1330, context-aware system 1310 translates the message in real time at translation service 1312. At 1332, translation service 1312 provides the translated message to context-aware system 1310. At 1334, context-aware system 1310 returns the translated message to communication app 1306. At 1336, communication app 1306 transmits the translated message over an RTP stream with priority information using VoNR to carrier network 1308. At 1338, carrier network 1308 delivers the translated message to recipient device 1304 using an RTP stream. At 1340, recipient device 1304 plays the translated message with prominence at OS

1314. At 1342, recipient device 1304 plays the voice message, audibly or visually, at recipient device 1304.

Figure 14:
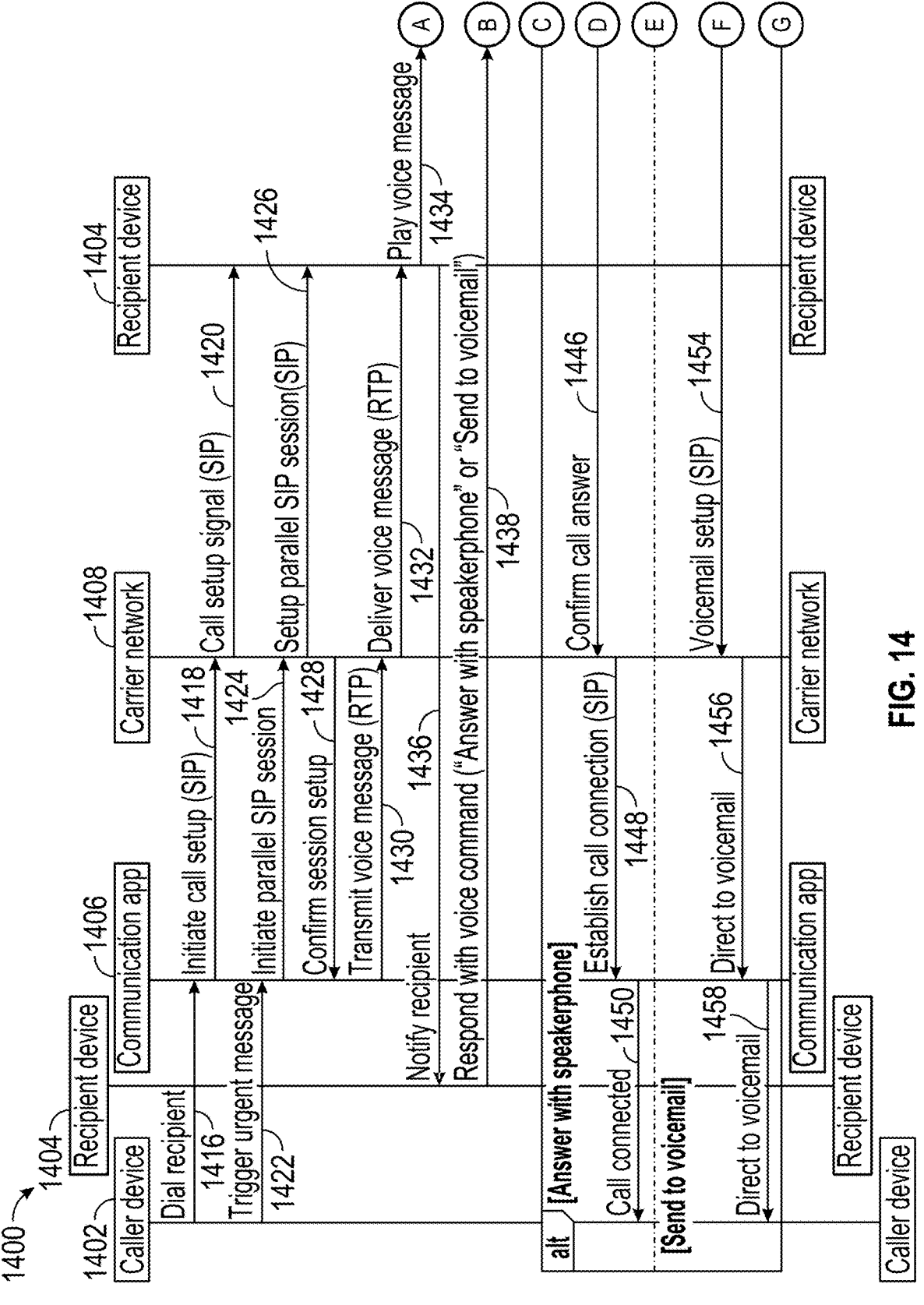
FIG. 14 is a sequence diagram of an illustrative process for real-time messaging associated with call setup with contextual voice response associated with call setup capability, in accordance with some embodiments of the present disclosure.
Figure 14:
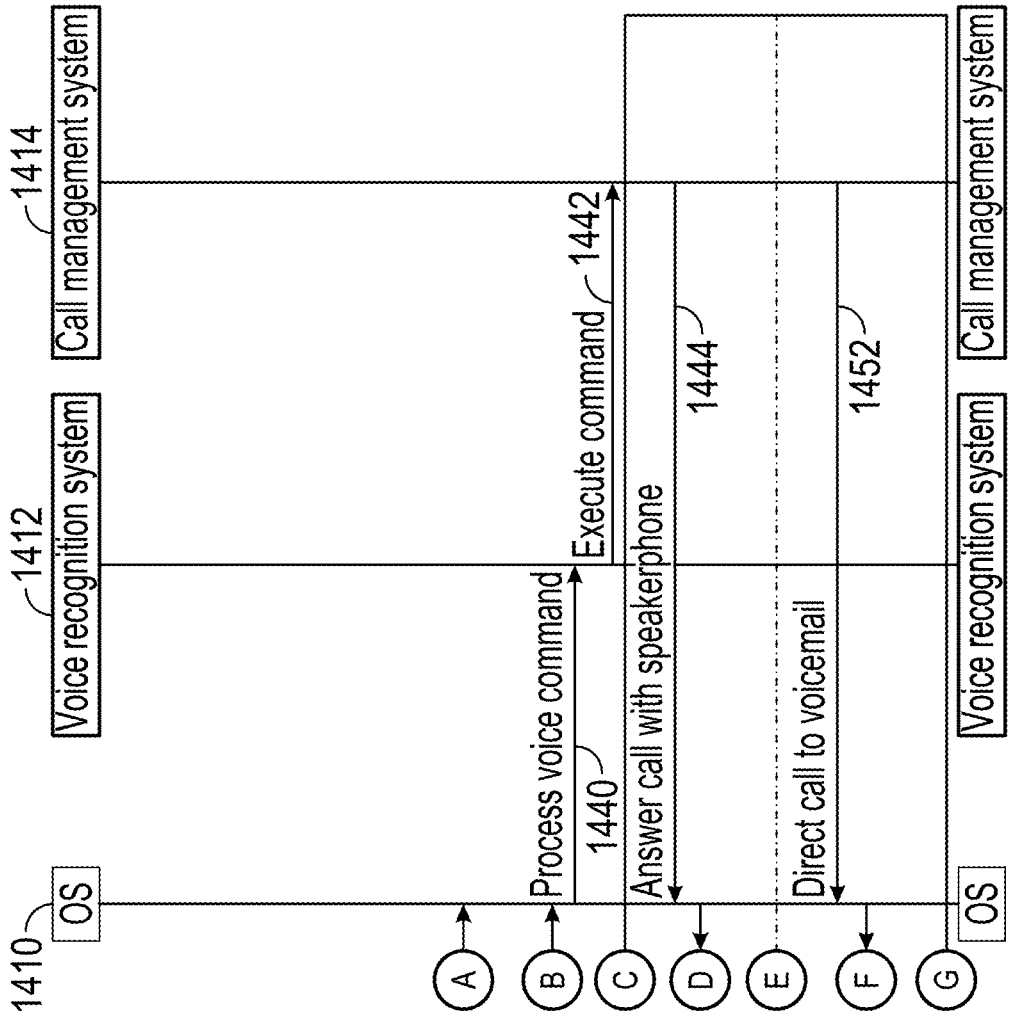

FIG. 14 is a sequence diagram of an illustrative process for real-time messaging associated with call setup with contextual voice response associated with call setup capability, in accordance with some embodiments of the present disclosure. In some embodiments, system 1400 includes caller device 1402, recipient device 1404, communication application 1406, carrier network 1408, OS 1410, voice recognition system 1412, and call management system 1414. In some embodiments, OS 1410 is the operating system of recipient device 1404. System 1400 may include additional servers, devices, and/or networks.

In some embodiments, FIG. 14 depicts a system with the capability for contextual voice responses during the call setup phase, allowing recipients to take immediate action based on the urgency of the message. When a caller initiates a call and sends a message, the recipient hears the message while the phone is ringing. The recipient can then respond with specific voice commands to manage the call effectively. The process begins with the caller initiating a call. The carrier's network uses SIP to establish the call setup. Simultaneously, the caller can trigger an urgent message using a command or app feature, which sets up a parallel SIP session for transmitting the urgent message via VoNR technology. RTP is used to deliver the message to the recipient's device, which plays the message audibly while the phone is ringing. The recipient, upon hearing the message, can use predefined voice commands such as "Answer with speakerphone" or "Send to voicemail" or custom voice commands which may be interpreted by an AI model running locally on the device or in the cloud. These commands are recognized by the device's integrated voice recognition or artificial intelligence software, which processes the command and takes the appropriate action. The voice recognition software interfaces with the call management system to execute the commands seamlessly. For example, if the recipient says, "Answer with speakerphone," the device immediately transitions the call to speakerphone mode. If the recipient says, "Send to voicemail," the call is directed to the voicemail system.

In some embodiments, at 1416, caller device 1402 dials recipient device 1404 through communication app 1406. At 1418, communication app 1406 initiates call setup using SIP at carrier network 1408. At 1420, carrier network 1408 transmits a call setup signal using SIP to recipient device 1404. At 1422, caller device 1402 triggers a message at communication app 1406, for example, using a command or app feature. At 1424, communication app 1406 initiates a parallel SIP session at carrier network 1408. At 1426, carrier network 1408 sets up the parallel SIP session at recipient device 1404. At 1428, carrier network 1408 confirms session setup at communication app 1406. At 1430, communication app 1406 transmits the voice message over an RTP stream to carrier network 1408, for example, using VoNR technology. At 1432, carrier network 1408 delivers the voice message over an RTP stream to recipient device 1404. At 1434, recipient device 1404 plays the voice message at OS 1410. At 1436, recipient device 1404 plays the voice message, audibly or visually, at recipient device 1404, while the phone is ringing. At 1438, recipient device 1404 responds with a voice command, e.g., "Answer with speakerphone," or "Send to voicemail," to OS 1410, or any other custom voice command. In some embodiments, the voice commands are interpreted by an AI model running locally on the device or in the cloud, e.g., predictive model 700, as described further above with reference to FIG. 7. At 1440, OS 1410 processes the voice command at voice recognition system 1412, after the command is recognized by recipient device 1404's integrated voice recognition or artificial intelligence software, which processes the command and takes appropriate action. At 1442, voice recognition system 1412 executes the command at call management system 1414. In some embodiments, the voice recognition software interfaces with the call management system to execute the commands seamlessly. For example, if the command is, "Answer with speakerphone," the device immediately transitions the call to speakerphone mode. If the command is, "Send to voicemail," the call is directed to the voicemail system.

In some embodiments, when the voice command is "Answer with speakerphone" and recipient device 1404 answers with the speakerphone, at 1444, call management system 1414 answers the call with speakerphone. In some embodiments, at 1446, OS 1410 confirms that the call was answered at carrier network 1408. In some embodiments, at 1448, carrier network 1408 establishes the call connection using SIP at communication app 1406. At 1450, communication app 1406 connects the call with caller device 1402.

In some embodiments, when the voice command is "send to voicemail" and recipient device 1404 sends the call to voicemail, at 1452, call management system 1414 directs the call to voicemail at OS 1410. In some embodiments, at 1454, OS 1410 sets up the voicemail using SIP at carrier network 1408. At 1456, carrier network 1408 directs the call to voicemail at communication app 1406. In some embodiments, at 1458, communication app 1406 directs the call to voicemail at caller device 1402.

Figure 15:
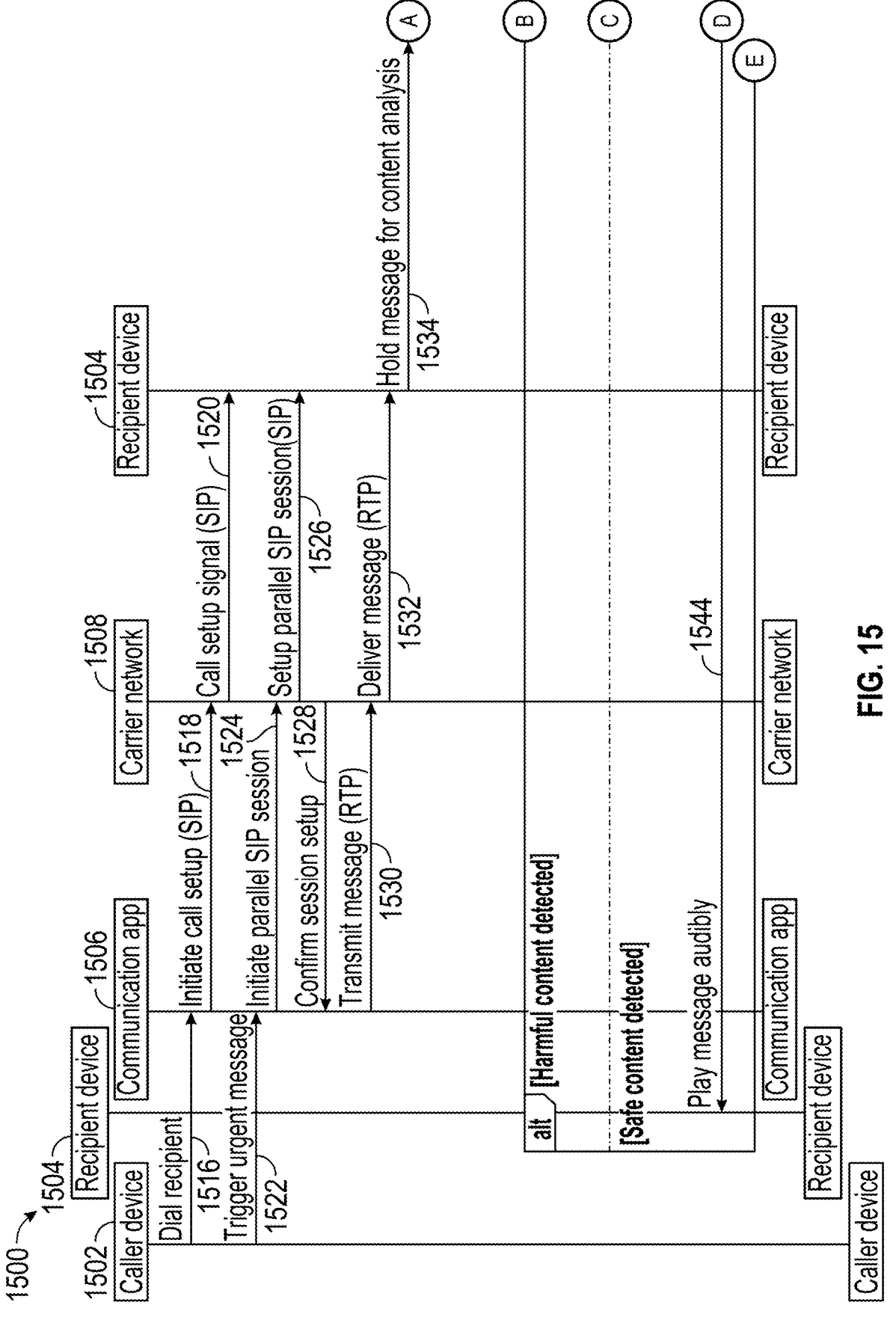
FIG. 15 is a sequence diagram of an illustrative process for real-time messaging associated with call setup with real-time content monitoring and filtering techniques, in accordance with some embodiments of the present disclosure.
Figure 15:
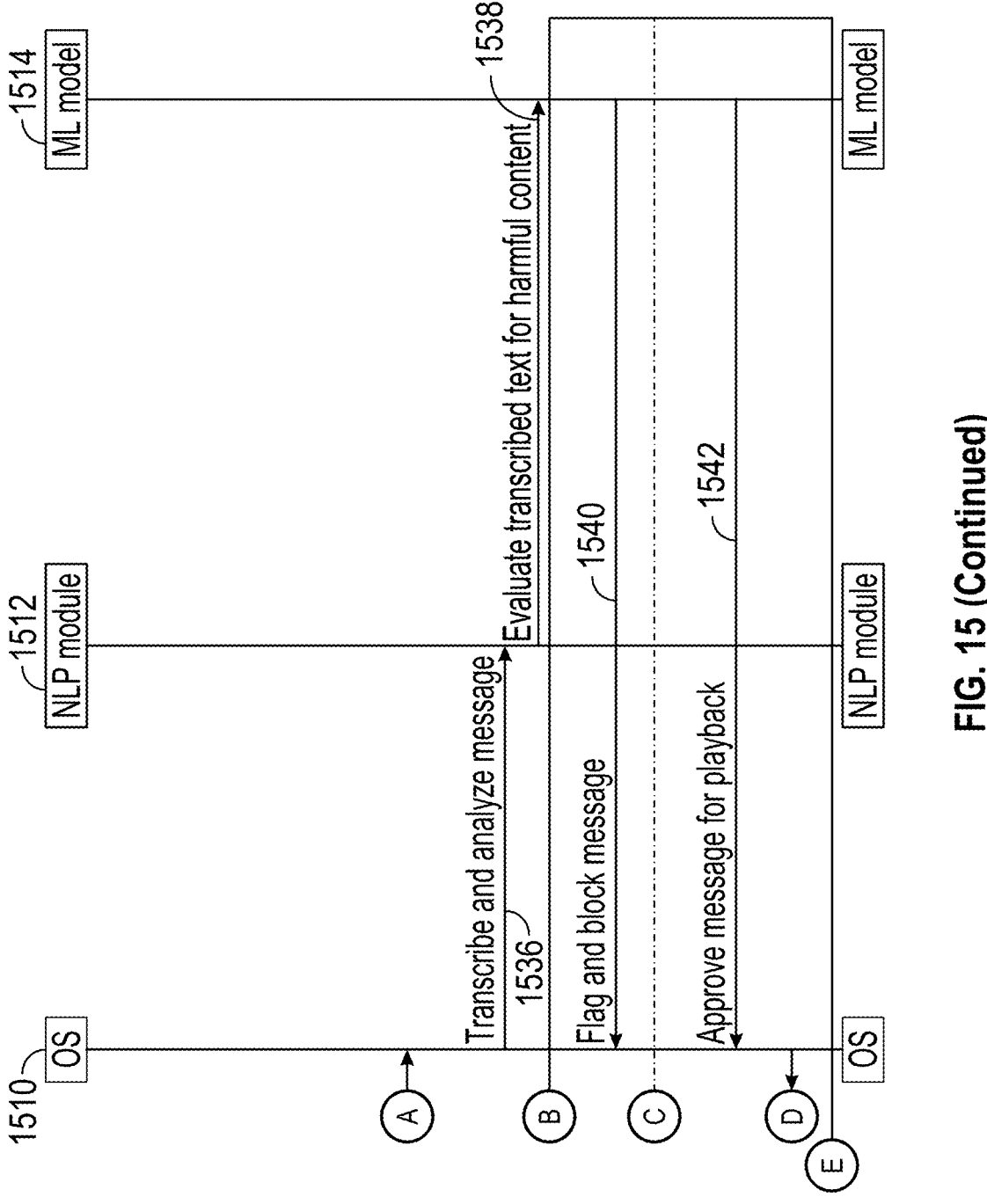

FIG. 15 is a sequence diagram of an illustrative process for real-time messaging associated with call setup with real-time content monitoring and filtering techniques, in accordance with some embodiments of the present disclosure. In some embodiments, system 1500 includes caller device 1502, recipient device 1504, communication application 1506, carrier network 1508, recipient device 1504, OS 1510, natural language processing (NLP) module 1512, and machine learning (ML) model 1514. In some embodiments, OS 1510 is the operating system of recipient device 1504. System 1500 may include additional servers, devices, and/or networks. In some embodiments, ML model 1514 is a predictive model, e.g., predictive model 700, as described further above with reference to FIG. 7.

In some embodiments, FIG. 15 depicts a system incorporating real-time content monitoring and filtering technologies directly on the recipient's device to analyze and block inappropriate or harmful messages before they are played.

In some embodiments, at 1516, caller device 1502 dials recipient device 1504 through communication app 1506. At 1518, communication app 1506 initiates call setup using SIP at carrier network 1508. At 1520, carrier network 1508 transmits a call setup signal using SIP to recipient device 1504. At 1522, caller device 1502 triggers a message (e.g., an urgent message) at communication app 1506. At 1524, communication app 1506 initiates a parallel SIP session at carrier network 1508. At 1526, carrier network 1508 sets up the parallel SIP session at recipient device 1504. At 1528, carrier network 1508 confirms session setup at communication app 1506. At 1530, communication app 1506 transmits the message over an RTP stream via VoNR to carrier network 1508. At 1532, carrier network 1508 delivers the message over an RTP stream to recipient device 1504. At 1534, recipient device 1504 holds the message for content analysis at OS 1510. At 1536, OS 1510 transcribes and analyzes the message at NLP module 1512. At 1538, NLP module 1512 evaluates the transcribed text for harmful content at machine learning model 1514. In some embodiments, recipient device uses integrated NLP algorithms to transcribe and analyze the message.

In some embodiments, when ML Model 1514 detects harmful content, e.g., inappropriate language or patterns, at 1540, ML model 1514 flags and blocks the message at OS 1510.

In some embodiments, when ML Model 1514 does not detect harmful content, at 1542, ML Model approves the message for playback at OS 1510. At 1544, OS 1510 plays the message audibly at recipient device 1504.

Figure 16:
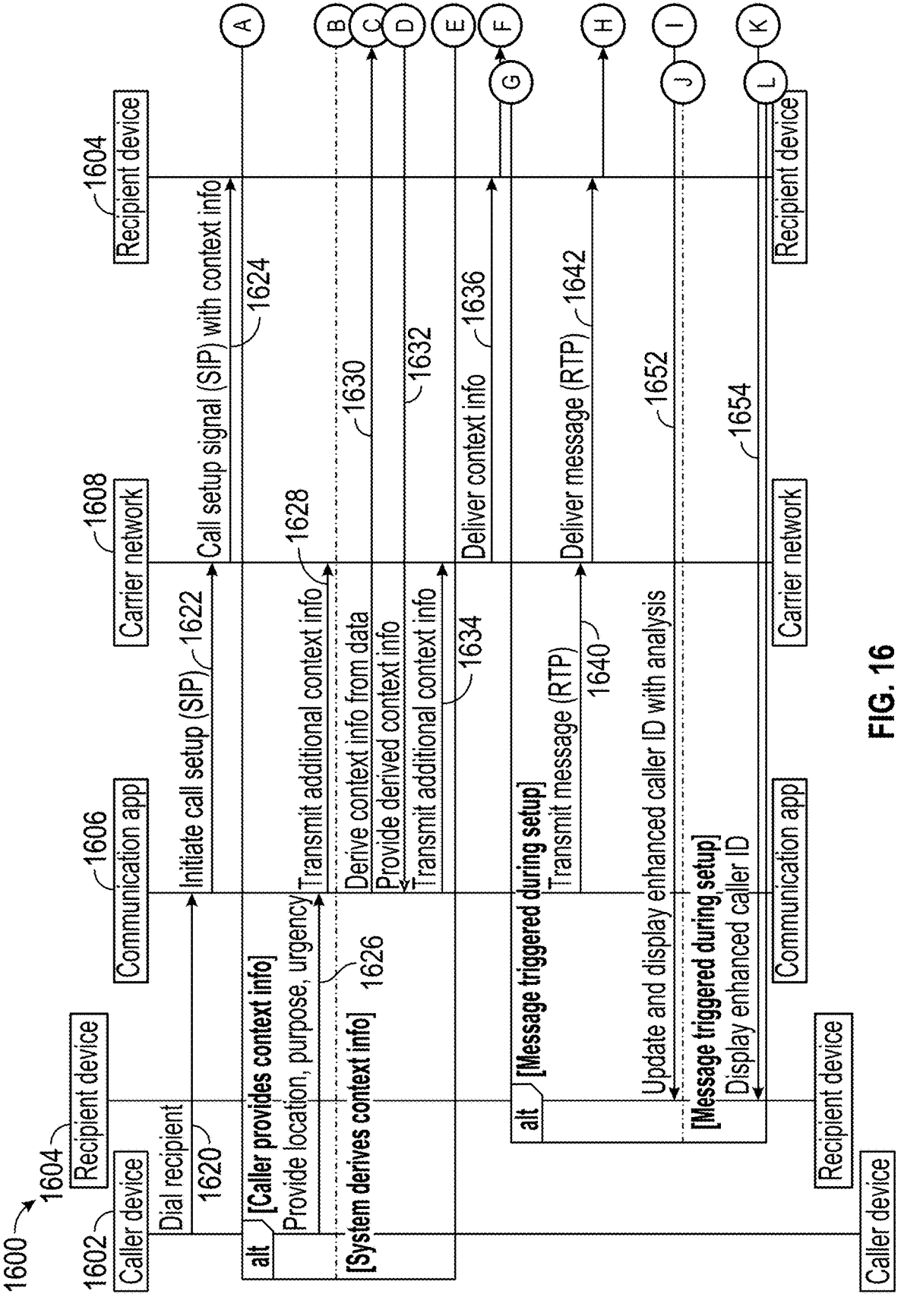
FIG. 16 is a sequence diagram of an illustrative process for real-time messaging associated with call setup with enhanced context-based caller identification, in accordance with some embodiments of the present disclosure.
Figure 16:
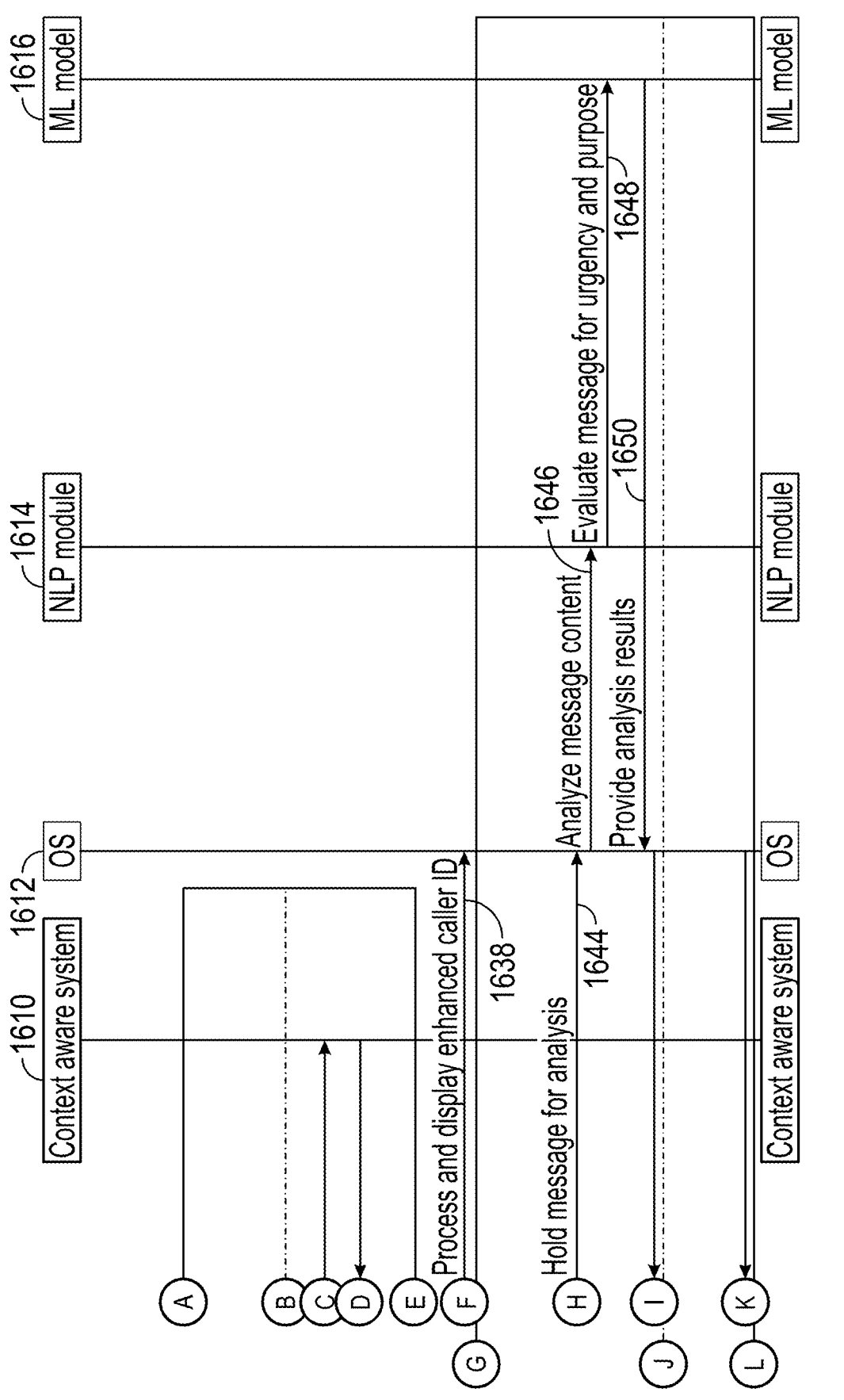

FIG. 16 is a sequence diagram of an illustrative process for real-time messaging associated with call setup with enhanced context-based caller identification, in accordance with some embodiments of the present disclosure. In some embodiments, system 1600 includes caller device 1602, recipient device 1604, communication application 1606, carrier network 1608, context-aware system 1610, OS 1612, natural language processing (NLP) module 1614, machine learning (ML) model 1616. System 1600 may include additional servers, devices, and/or networks. In some embodiments, OS 1612 is the operating system of recipient device 1604. In some embodiments, ML model 1616 is a predictive model, e.g., predictive model 700, as described further above with reference to FIG. 7.

In some embodiments, FIG. 16 displays enhanced caller ID with additional contextual information such as the caller's location, purpose of the call, and urgency level. This contextual information is derived from message analysis or caller input and is shown to the recipient during the call setup phase.

In some embodiments, at 1620, caller device 1602 dials recipient device 1604 through communication app 1606. At 1622, communication app 1606 initiates call setup using SIP at carrier network 1608. At 1624, carrier network 1608 sends a call setup signal using SIP with context information to recipient device 1604.

In some embodiments, when the caller device 1602 provides context information, at 1626, caller device 1602 provides communication app 1606 with its location, a purpose of the call, and an urgency level for the call. In some embodiments, at 1628, communication app 1606 transmits additional context information to carrier network 1608.

In some embodiments, when the system derives context information, at 1630, communication app 1606 derives context information from data at context-aware system 1610. In some embodiments, at 1632, context-aware system 1610 provides derived context information to communication app 1606. In some embodiments, at 1634, communication app 1606 transmits additional context information to carrier network 1608.

At 1636, carrier network 1608 delivers context information to recipient device 1604. At 1638, recipient device 1604 processes and displays enhanced caller identification (caller ID) at OS 1612. In some examples, this enhanced caller ID provides the recipient with a detailed view of the incoming call, including the caller's location, the reason for the call, and how urgent it is.

In some embodiments, when the message is triggered during setup, at 1640, communication app 1606 transmits the message over an RTP stream to carrier network 1608. In some embodiments, at 1642, carrier network 1608 delivers the message over an RTP stream to recipient device 1604. In some embodiments, at 1644, recipient device 1604 holds the message for content analysis at OS 1612. In some embodiments, at 1646, OS 1612 analyzes the message at NLP module 1614. In some embodiments, at 1648, NLP module 1614 evaluates the message for urgency and purpose at ML model 1616. In some examples, the urgency level and call purpose are determined based on predefined keywords or phrases detected in the message. In some examples, the analysis is performed in a buffer, ensuring that it completes faster than the actual duration of the message. In some embodiments, at 1650, ML model 1616 provides the results of the analysis to OS 1612. In some embodiments, at 1652, OS 1612 updates and displays enhanced caller ID with analysis at the recipient device 1604.

In some embodiments, when no message is triggered, at 1654, OS 1612 displays enhanced caller ID on caller device 1602.

Figure 17:
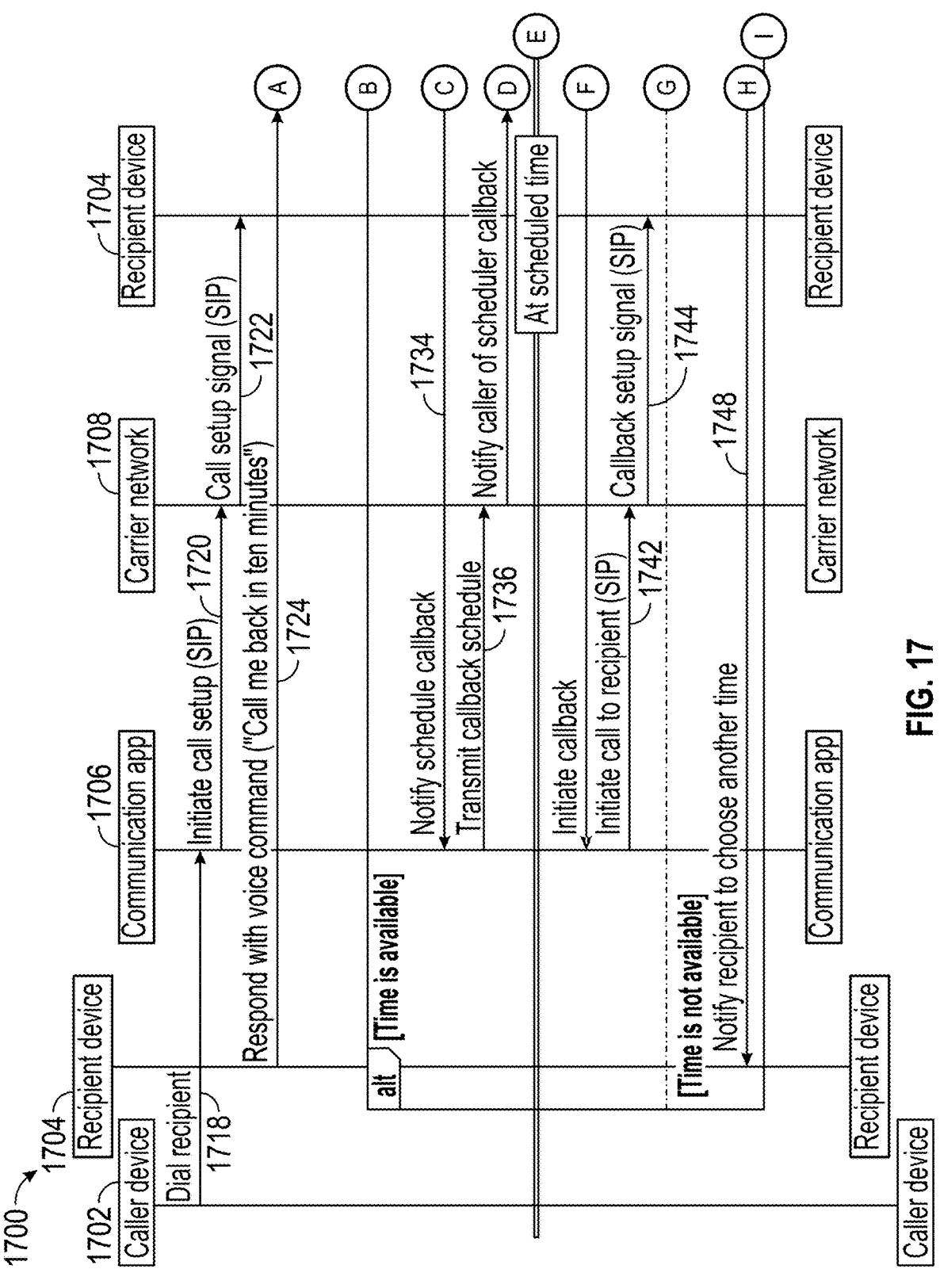
FIG. 17 is a sequence diagram of an illustrative process for real-time messaging associated with call setup with callback scheduling capability, in accordance with some embodiments of the present disclosure.
Figure 17:
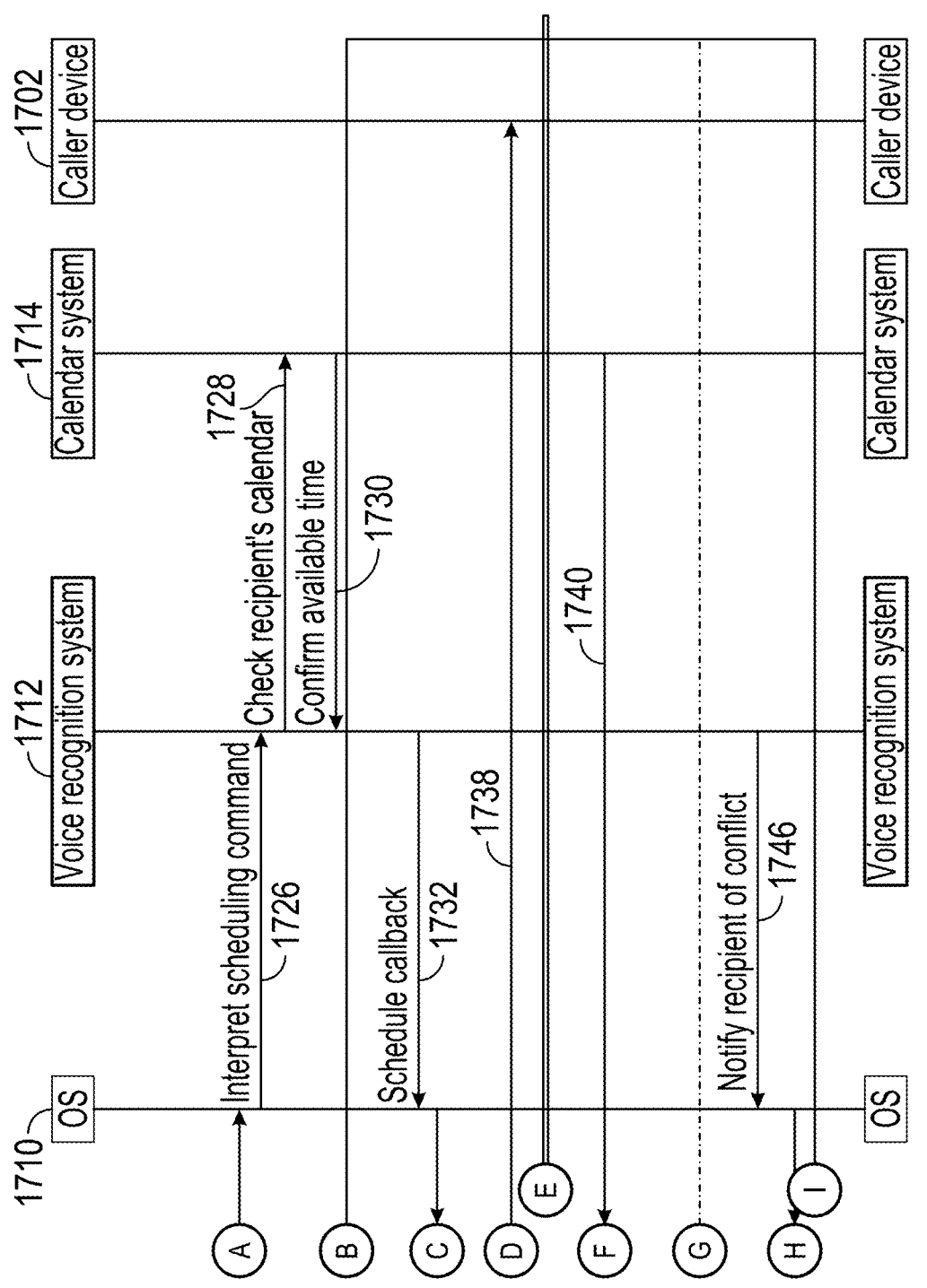

FIG. 17 is a sequence diagram of an illustrative process for real-time messaging associated with call setup with callback scheduling capability, in accordance with some embodiments of the present disclosure. In some embodiments, system 1700 includes caller device 1702, recipient device 1704, communication application 1706, carrier network 1708, OS 1710, voice recognition system 1712, and calendar system 1714. In some embodiments, OS 1710 is the operating system of recipient device 1704. System 1700 may include additional servers, devices, and/or networks.

In some embodiments, FIG. 17 depicts integrated scheduling features that allow recipients to schedule a callback time from the caller, ensuring optimal timing based on the recipient's availability.

In some embodiments, at 1718, caller device 1702 dials recipient device 1704 through communication app 1706. At 1720, communication app 1706 initiates call setup using SIP at carrier network 1708. At 1722, carrier network 1708 transmits a call setup signal using SIP to recipient device 1704. At 1724, recipient device 1704 responds to OS 1710 with a voice command, e.g., "Call me back in ten minutes." At 1726, OS 1710 interprets the scheduling command at voice recognition system 1712. At 1728, voice recognition system 1712 checks the recipient's calendar at calendar system 1714. At 1730, calendar system 1714 confirms whether there are available times for a callback with voice recognition system 1712.

In some embodiments, when a callback time is available, at 1732, voice recognition system 1712 schedules a callback time with OS 1710. In some embodiments, at 1734, OS 1710 notifies communication app 1706 of the scheduled callback time. In some embodiments, at 1736, communication app 1706 transmits the callback schedule to carrier network 1708. In some embodiments, at 1738, carrier network 1708 notifies caller device 1702 of the scheduled callback. In some examples, the callback schedule is processed as a calendar entry, reminder, or any other non-calendar method (for example, from within the phone or Facetime application itself) on caller device 1702 or recipient device 1704. In some embodiments, at the scheduled time, at 1740, calendar system 1714 initiates the callback at communication app 1706. In some embodiments, at 1742, communication app 1706 initiates the call to the recipient at carrier network 1708 using SIP. At 1744, carrier network 1708 transmits a call setup signal using SIP to recipient device 1704.

In some embodiments, when a callback time is not available, at 1746, voice recognition system 1712 notifies recipient device 1704 of the conflict at OS 1710. At 1748, OS 1710 notifies recipient device 1704 to choose another time for the callback.

Figure 18:
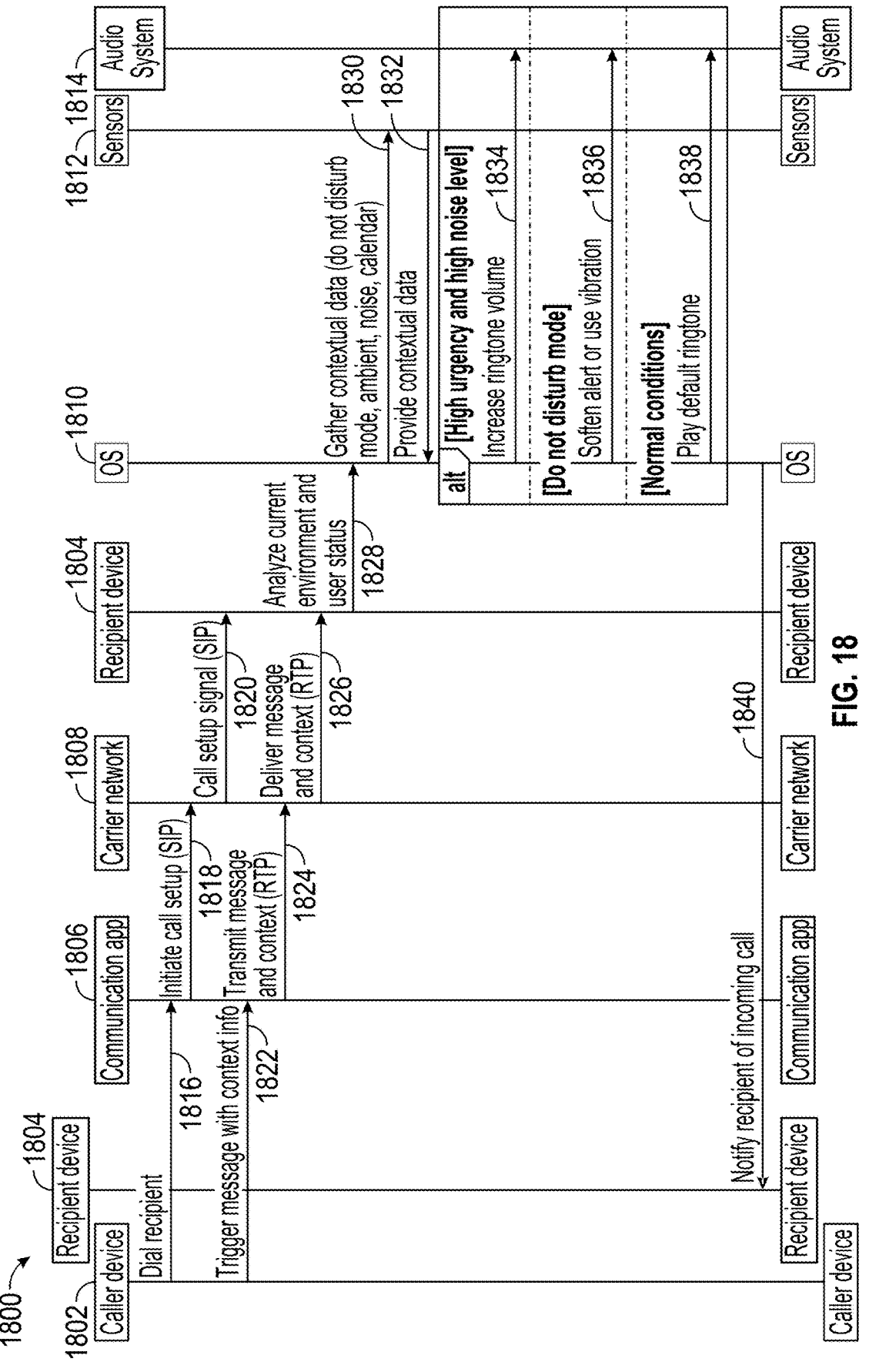
FIG. 18 is a sequence diagram of an illustrative process for real-time messaging associated with call setup with context-based adaptive audio alerts, in accordance with some embodiments of the present disclosure.

FIG. 18 is a sequence diagram of an illustrative process for real-time messaging associated with call setup with context-based adaptive audio alerts, in accordance with some embodiments of the present disclosure. In some embodiments, system 1800 includes caller device 1802, recipient device 1804, communication application 1806, carrier network 1808, OS 1810, sensors 1812, and audio system 1814. System 1800 may include additional servers, devices, and/or networks. In some embodiments, OS 1810 is the operating system of recipient device 1804. In some embodiments, sensors 1812 are sensors on recipient device 1804. In some embodiments, sensors 1812 are sensors on other devices associated with recipient device 1804, for example, smartwatches or headphones logged in to the same user profile associated with recipient device 1804.

In some embodiments, FIG. 18 depicts a system for adaptive audio alerts that change based on the context of the call, such as louder ringtones for urgent calls or softer alerts during do-not-disturb periods. This feature enhances the main idea of providing contextual and real-time information by dynamically adjusting audio notifications according to the user's current environment and preferences.

In some embodiments, at 1816, caller device 1802 dials recipient device 1804 through communication app 1806. At 1818, communication app 1806 initiates call setup using SIP at carrier network 1808. At 1820, carrier network 1808 transmits a call setup signal using SIP to recipient device 1804. At 1822, caller device 1802 triggers a message with context information at communication app 1306. At 1824, communication app 1806 transmits the message with the context information via an RTP stream to carrier network 1808. At 1826, carrier network 1808 delivers the message and the context information via an RTP stream to recipient device 1804. At 1828, recipient device 1804 analyzes the current environment and user status at OS 1810. At 1830, OS 1810 gathers contextual data, including whether recipient device 1804 is in a DND mode, ambient noise around recipient device 1804 (e.g., from sensors 1812), and calendar information stored on recipient device 1804. At 1832, sensors 1812 provide contextual data at OS 1810. In some embodiments, when the message has a high urgency level and there is a high level of noise in the environment of recipient device 1804, at 1834, OS 1810 increases the ringtone volume at audio system 1814 of recipient device 1804. In some embodiments, when recipient device 1804 is in the DND mode, at 1836, OS 1810 softens the alert or uses vibration at audio system 1814 of recipient device 1804. In some embodiments, when recipient device 1804 is in normal conditions, at 1838, OS 1810 plays the default ringtone of audio system 1814 of recipient device 1804. At 1840, OS 1810 notifies recipient device 1804 of the incoming call.

Figure 19:
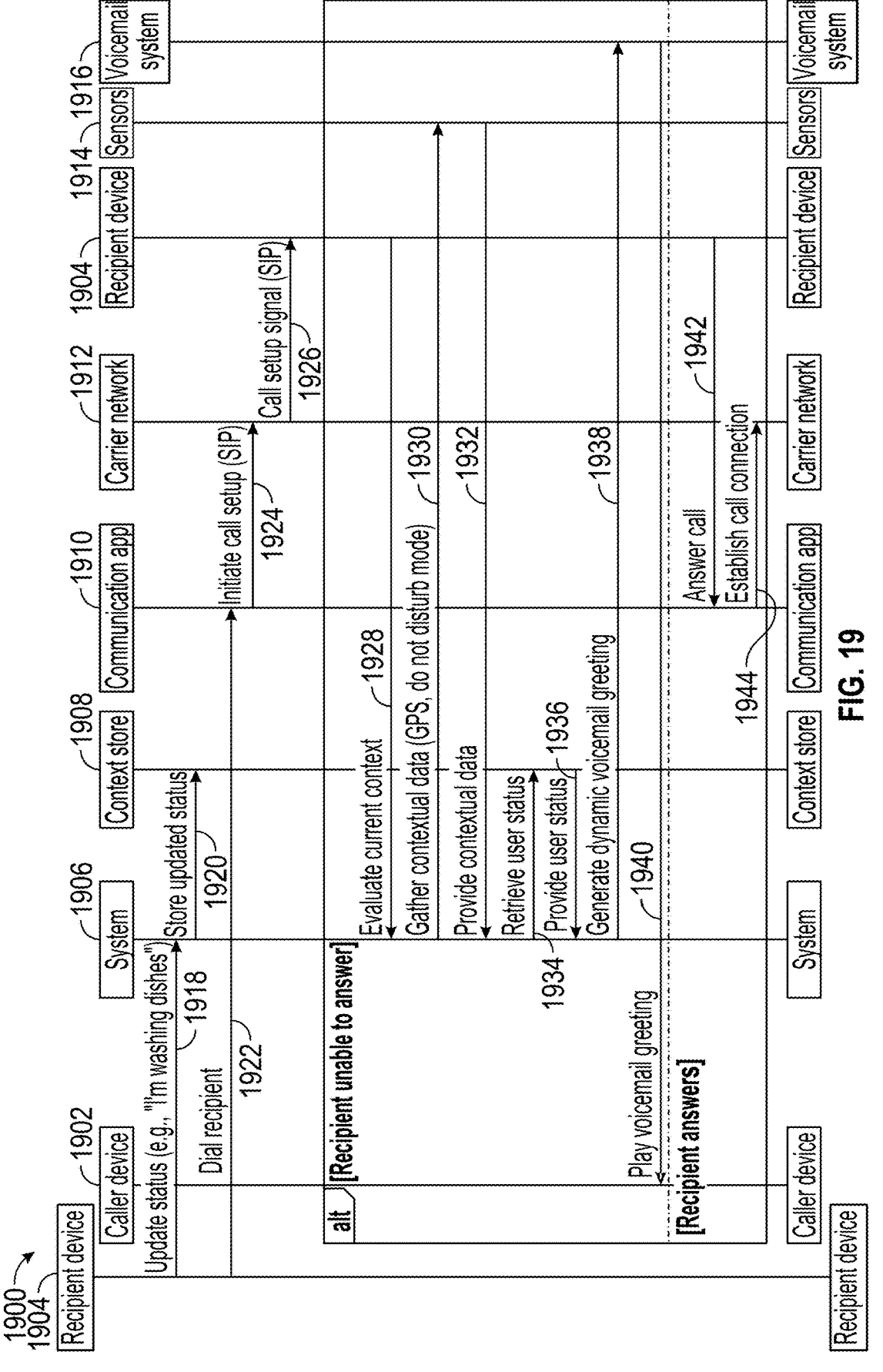
FIG. 19 is a sequence diagram of an illustrative process for real-time messaging associated with call setup with customizable notification profiles for different scenarios, in accordance with some embodiments of the present disclosure.

FIG. 19 is a sequence diagram of an illustrative process for real-time messaging associated with call setup with customizable notification profiles for different scenarios, in accordance with some embodiments of the present disclosure. In some embodiments, system 1900 includes caller device 1902, recipient device 1904, system 1906, context store 1908, communication application 1910, carrier network 1912, sensors 1914, and voicemail system 1916. System 1900 may include additional servers, devices, and/or networks. In some embodiments, sensors 1914 are sensors on recipient device 1904. In some embodiments, sensors 1914 are sensors on other devices associated with recipient device 1904, for example, smartwatches or headphones logged in to the same user profile associated with recipient device 1904. In some embodiments, system 1906 is a system associated with recipient device 1904. In some embodiments, voicemail system 1916 is a voicemail system associated with recipient device 1904. In some embodiments, communication app 1910 is associated with recipient device 1904.

In some embodiments, FIG. 19 depicts a system that allows users to create customizable notification profiles for different scenarios (e.g., driving, at work, in a meeting) to tailor how messages are delivered, and alerts are managed. In some embodiments, at 1918, recipient device 1904 updates its status at system 1906, e.g., "I'm washing dishes." At 1920, system 1906 stores the updated status at context store 1908. At 1922, caller device 1902 dials recipient device 1904 through communication app 1910. At 1924, communication app 1910 initiates call setup using SIP at carrier network 1912. At 1926, carrier network 1912 transmits a call setup signal using SIP to recipient device 1904.

In some embodiments, when recipient device 1904 is unable to answer the call from caller device 1902, at 1928, recipient device 1904 evaluates the current context at system 1906. In some embodiments, at 1930, system 1906 gathers contextual context, e.g., GPS data, and/or whether recipient device 1904 is in a DND mode, from sensors 1914. In some embodiments, at 1932, sensors 1914 provide contextual data to system 1906. In some embodiments, at 1934, system 1906 retrieves the user status at context store 1908. In some embodiments, at 1936, context store 1908 provides the user status to system 1906. In some embodiments, at 1938, system 1906 generates a dynamic voicemail greeting at voicemail system 1916. In some embodiments, at 1940, voicemail system 1916 plays the dynamic voicemail greeting at caller device 1902.

In some embodiments, when recipient device 1904 answers the call, at 1942, recipient device 1904 answers the call at communication app 1910. In some embodiments, at 1944, communication app 1910 establishes a call connection at carrier network 1912.

Figure 20:
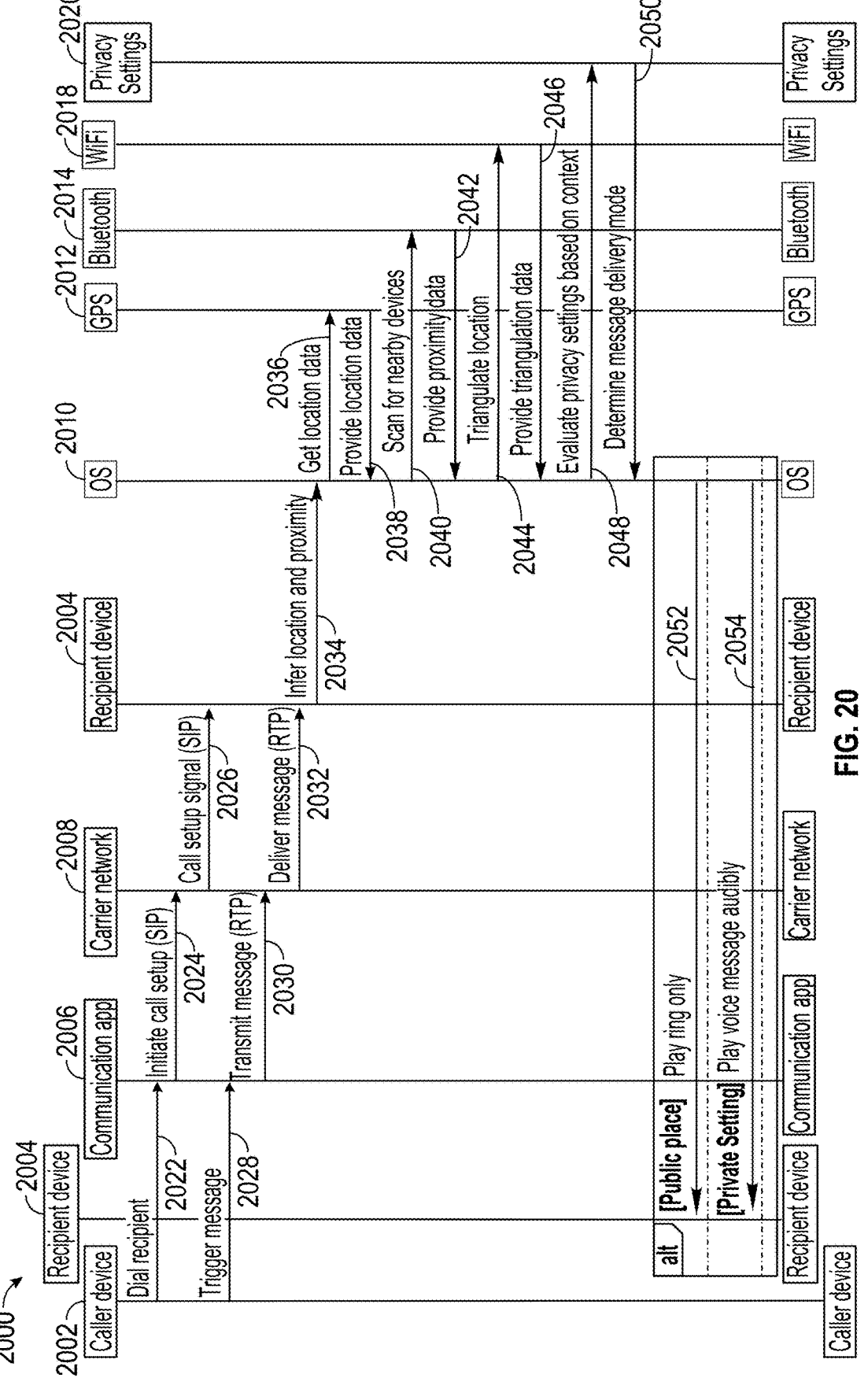
FIG. 20 is a sequence diagram of an illustrative process for real-time messaging associated with call setup with privacy management mechanisms that infer the location of the recipient device and the proximity to other devices, in accordance with some embodiments of the present disclosure.

FIG. 20 is a sequence diagram of an illustrative process for real-time messaging associated with call setup with privacy management mechanisms that infer the location of the recipient device and the proximity to other devices, in accordance with some embodiments of the present disclosure. In some embodiments, system 2000 includes caller device 2002, recipient device 2004, communication application 2006, carrier network 2008, OS 2010, Global Positioning System (GPS) 2012, Bluetooth 2014, Wi-Fi 2018, and Privacy Settings 2020. In some embodiments, OS 2010 is the operating system of recipient device 2004. System 2000 may include additional servers, devices, and/or networks. In some embodiments, communication app 2006 is associated with recipient device 2004.

In some embodiments, FIG. 20 depicts a system that includes privacy management mechanisms that infer the location of the recipient device and the proximity to other devices. In some examples, these mechanisms alter the message delivery mode based on user-defined privacy settings. For example, if the recipient is in a public place, only the ring is played, and if the recipient is in a private setting, the voice message is played. This ensures that sensitive voice messages are not overheard in inappropriate settings, maintaining the user's privacy. In some embodiments, to infer location and proximity, various technologies may be used including: GPS 2012 for location detection (for example, determining if the user's location is close to a known point of interest on map), Bluetooth 2014 for proximity sensing (e.g., scanning for Bluetooth devices), filtering out previously connected or known devices (e.g., device identifiers) and measuring the signal strength (RSSI) of nearby unknown devices to determine if the user's device is near devices of other users, and Wi-Fi 2018 triangulation to enhance the accuracy of the location detection.

In some embodiments, at 2022, caller device 2002 dials recipient device 2004 through communication app 2006. At 2024, communication app 2006 initiates call setup using SIP at carrier network 2008. At 2026, carrier network 2008 transmits a call setup signal using SIP to recipient device 2004. At 2028, caller device 2002 triggers a message at communication app 2006. At 2030, communication app 2006 transmits the message via an RTP stream to carrier network 2008. At 2032, carrier network 2008 delivers the message via an RTP stream to recipient device 2004. At 2034, recipient device 2004 sends a message to OS 2010 to infer location and proximity information. At 2036, OS 2010 receives location data from GPS 2012. At 2038, GPS 2012 provides location data to OS 2010. At 2040, OS 2010 scans for nearby devices using Bluetooth 2014. At 2042, Bluetooth 2014 provides proximity data to OS 2010. At 2044, OS 2010 triangulates location (e.g., of the recipient deice 2004) using Wi-Fi 2018. At 2046, Wi-Fi 2018 provides the triangulation data to OS 2010. At 2048, OS 2010 evaluates privacy settings based on context at privacy settings 2020. At 2050, privacy settings 2020 determine the message delivery mode and send it to OS 2010. In some embodiments, when recipient device 2004 is in a public place, at 2052, OS 2010 plays only the ring at recipient device 2004. In some embodiments, when recipient device 2004 is in a private setting, at 2054, OS 2010 plays the voice message audibly at recipient device 2004.

Terminology

The terminology used herein is for the purpose of describing particular embodiments only and is not intended to be limiting of the disclosure.

Throughout the specification, the term "comprising" shall be understood to have a broad meaning similar to the term "including" and will be understood to imply the inclusion of a stated integer or step or group of integers or steps but not the exclusion of any other integer or step or group of integers or steps. This definition also applies to variations on the term "comprising" such as "comprise" and "comprises."

Throughout the specification, the phrases "in response to" and "based on" shall be understood to have a broad meaning unless context requires otherwise. For example, "in response to" can refer to a step that is in direct or indirect response to a prior step, and "based on" can refer to a step that is based at least in part on a prior step.

As used herein, the terms "real time," "simultaneous," "substantially on-demand," and the like are understood to be nearly instantaneous but may include delay due to practical limits of the system. Such delays may be on the order of milliseconds or microseconds, depending on the application and nature of the processing. Relatively longer delays (e.g., greater than a millisecond) may result due to communication or processing delays, particularly in remote and cloud computing environments.

As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Although at least some embodiments are described as using a plurality of units or modules to perform a process or processes, it is understood that the process or processes may also be performed by one or a plurality of units or modules. Additionally, it is understood that the term controller/control unit may refer to a hardware device that includes a memory and a processor. The memory may be configured to store the units or the modules, and the processor may be specifically configured to execute said units or modules to perform one or more processes which are described herein.

The use of the terms "first," "second," "third," and so on, herein, are provided to identify structures or operations, without describing an order of structures or operations, and, to the extent the structures or operations are used in an embodiment, the structures may be provided or the operations may be executed in a different order from the stated order unless a specific order is definitely specified in the context.

The methods and/or any instructions for performing any of the embodiments discussed herein may be encoded on computer-readable media. Computer-readable media includes any media capable of storing data. The computer-readable media may be transitory, including, but not limited to, propagating electrical or electromagnetic signals, or may be non-transitory (e.g., a non-transitory, computer-readable medium accessible by an application via control or processing circuitry from storage) including, but not limited to, volatile and non-volatile computer memory or storage devices such as a hard disk, floppy disk, USB drive, DVD, CD, media cards, register memory, processor caches, random access memory (RAM), UltraRAM, cloud-based storage, and the like.

The interfaces, processes, and analysis described may, in some embodiments, be performed by an application. The application may be loaded directly onto each device of any of the systems described or may be stored in a remote server or any memory and processing circuitry accessible to each device in the system. The generation of interfaces and analysis there-behind may be performed at a receiving device, a sending device, or some device or processor therebetween.

Any use of a phrase such as "in some embodiments" or the like with reference to a feature is not intended to link the feature to another feature described using the same or a similar phrase. Any and all embodiments disclosed herein are combinable or separately practiced as appropriate. Absence of the phrase "in some embodiments" does not infer that the feature is necessary. Inclusion of the phrase "in some embodiments" does not infer that the feature is not applicable to other embodiments or even all embodiments.

The systems and processes discussed herein are intended to be illustrative and not limiting. One skilled in the art would appreciate that the actions of the processes discussed herein may be omitted, modified, combined, duplicated, rearranged, and/or substituted, and any additional actions may be performed without departing from the scope of the invention. More generally, the disclosure herein is meant to provide examples and is not limiting. Only the claims that follow are meant to set bounds as to what the present disclosure includes. Furthermore, it should be noted that the features and limitations described in any some embodiments may be applied to any other embodiment herein, and flowcharts or examples relating to some embodiments may be combined with any other embodiment in a suitable manner, done in different orders, or done in parallel. In addition, the methods and systems described herein may be performed in real time. It should also be noted that the methods and/or systems described herein may be applied to, or used in accordance with, other methods and/or systems.

The foregoing is merely illustrative of the principles of this disclosure and its various embodiments. Various modifications may be made by those skilled in the art without departing from the scope of this disclosure. The above-described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations and modifications thereof, which are within the spirit of the following claims.

What is claimed is:

1. A method performed at a network for real-time messaging associated with call setup between a caller device and a recipient device, the method comprising:
    receiving, at the network, a call initiation signal from the caller device;
    initiating, at the network, the call setup at the recipient device;
    causing transmission, from status systems associated with the caller device to a context management system, of contextual information associated with the caller device;
    causing generation, using a machine learning model, at the context management system, of a message, wherein the message is based at least in part on the contextual information associated with the caller device;
    causing transmission, directly or indirectly, from the recipient device to the caller device, of information indicating media parameters the recipient device supports;
    transmitting, directly or indirectly, audio data for the call between the caller device and the recipient device;
    causing playing of a notification for the call at the recipient device;
    causing transmission of the message, directly or indirectly, from the caller device to a second device, wherein the second device is associated with the recipient device; and
    causing playing of the message at the second device.

2. The method of claim 1, wherein the network is a 5G network.

3. The method of claim 1, wherein the initiating, at the network, the call setup at the recipient device further comprises using a Session Initiation Protocol (SIP) invite.

4. The method of claim 3, wherein the information indicating the media parameters the recipient device supports comprises a SIP 200 OK message comprising a Session Description Protocol (SDP) answer.

5. The method of claim 4, wherein the transmitting, directly or indirectly, audio data for the call between the caller device and the recipient device comprises using Real-Time Transport Protocol (RTP) to stream the audio data, and wherein the transmitting the message to the second device comprises using RTP to stream the audio data between the caller device and a second device.

6. The method of claim 5, further comprising causing the caller device to transmit a SIP BYE message to the recipient device following the causing the playing of the message at the second device.

7. The method of claim 6, wherein the initiating, at the network, the call setup at the recipient device using the SIP invite comprises:

receiving, at a proxy call session control function (P-CSCF), the SIP invite including information for an offer for the call;

determining, at an application provider server of an application provider associated with the recipient device, that real-time messaging associated with the call setup is the enabled feature on the recipient device; and transmitting confirmation, to the caller device, that real-time messaging associated with the call setup is the enabled feature on the recipient device.

8. The method of claim 6, wherein the causing transmission of the message, directly or indirectly, to the second device using RTP to stream between the caller device and the second device further comprises:

receiving, at the P-CSCF, the SIP invite including information for an offer for the message; and transmitting the offer for the message to the recipient device.

9. The method of claim 1, wherein the causing the playing of the notification for the call at the recipient device further comprises:

receiving confirmation, at the caller device, that the recipient device is playing a notification, wherein the notification indicates that the recipient device is receiving the call.

10. The method of claim 1, wherein the causing the transmission, from the status systems associated with the caller device, the contextual information associated with the caller device further comprises:

causing to transmit, from the caller device to the context management system, a query to evaluate a current context of a caller user profile; and causing to transmit, from the context management system to the status systems associated with the caller device, requests for the contextual information.

11. A system comprising:

control circuitry configured to:

receive a call initiation signal from the caller device;

initiate the call setup at the recipient device;

cause transmission, from status systems associated with the caller device to a context management system, of contextual information associated with the caller device;

cause generation, using a machine learning model, at the context management system, of a message, wherein the message is at least in part based on the contextual information associated with the caller device;

cause transmission, directly or indirectly, from the recipient device to the caller device, of information indicating media parameters the recipient device supports;

transmit, directly or indirectly, audio data for a call between the caller device and the recipient device;

cause playing of a notification for the call at the recipient device;

cause transmission of the message, directly or indirectly, from the caller device to a second device, wherein the second device is associated with the recipient device; and cause playing of the message at the second device.

12. The system of claim 11, wherein the network is a 5G network.

13. The system of claim 11, wherein the control circuitry is further configured to initiate the call setup at the recipient device using a Session Initiation Protocol (SIP) invite.

14. The system of claim 13, wherein the information indicating the media parameters the recipient device supports comprises a SIP 200 OK message comprising a Session Description Protocol (SDP) answer.

15. The system of claim 14, wherein the control circuitry is configured to transmit, directly or indirectly, audio data for the call between the caller device and the recipient device using real-time transport Protocol (RTP) to stream the audio data and wherein the control circuitry is configured to transmit the message to the second device using RTP to stream the audio data between the caller device and the second device.

16. The system of claim 15, wherein the control circuitry is configured to cause the caller device to transmit a SIP BYE message to the recipient device following the causing the playing of the message at the second device.

17. The system of claim 16, wherein the control circuitry is configured to initiate the call setup at the recipient device using the SIP invite by:

receiving, at a proxy call session control function (P-CSCF), the SIP invite including information for an offer for the call;

determining, at an application provider server of an application provider associated with the recipient device, that real-time messaging associated with the call setup is an enabled feature on the recipient device; and transmitting confirmation, to the caller device, that real-time messaging associated with the call setup is the enabled feature on the recipient device.

18. The system of claim 16, wherein the control circuitry is further configured to cause the transmission of the message, directly or indirectly, to the second device using RTP to stream between the caller device and the second device by:

receiving, at the P-CSCF, the SIP invite including information for an offer for the message; and transmitting the offer for the message to the recipient device.

19. The system of claim 11, wherein the control circuitry is configured to cause the playing of the notification for the call at the recipient device by:

receiving confirmation, at the caller device, that the recipient device is playing the notification for the call, wherein the notification indicates that the recipient device is receiving the call.

20. The system of claim 11, wherein the control circuitry is configured to cause the transmission, from the status systems associated with the caller device, of the contextual information associated with the caller device by:

causing to transmit, from the caller device to the context management system, a query to evaluate a current context of a caller user profile; and causing to transmit, from the context management system to the status systems associated with the caller device, requests for the contextual information.

* * * * *